US012695168B2

(12) United States Patent
Tani et al.

(10) Patent No.: US 12,695,168 B2
(45) Date of Patent: Jul. 28, 2026

(54) WAVEGUIDE DEVICE INCLUDING A WAVEGUIDE MEMBER IN AN INORGANIC MATERIAL SUBSTRATE ATTACHED TO A SUPPORT SUBSTRATE AND WITH A LOW-LOSS DIELECTRIC PORTION

(71) Applicant: NGK INSULATORS, LTD., Nagoya City (JP)

(72) Inventors: Kentaro Tani, Nagoya (JP); Jungo Kondo, Miyoshi (JP)

(73) Assignee: NGK INSULATORS, LTD., Nagoya-City (JP)

( * ) Notice: Subject to any disclaimer, the term of this patent is extended or adjusted under 35 U.S.C. 154(b) by 190 days.

(21) Appl. No.: 18/422,061

(22) Filed: Jan. 25, 2024

(65) Prior Publication Data

US 2024/0162592 A1 May 16, 2024

Related U.S. Application Data

(63) Continuation of application No. PCT/JP2022/029941, filed on Aug. 4, 2022.

(30) Foreign Application Priority Data

Aug. 12, 2021 (JP) ................................ 2021-131758

(51) Int. Cl.
*H01P 3/00* (2006.01)
*H01P 3/02* (2006.01)

(52) U.S. Cl.
CPC .............. *H01P 3/006* (2013.01); *H01P 3/003* (2013.01); *H01P 3/026* (2013.01)

(58) Field of Classification Search
CPC ........... H01P 3/003; H01P 3/006; H01P 3/026
(Continued)

(56) References Cited

U.S. PATENT DOCUMENTS 6,674,347 B1 1/2004 Maruhashi et al.
7,561,006 B2 * 7/2009 Dutta ........................ H01P 9/00 333/156

(Continued)

FOREIGN PATENT DOCUMENTS

JP 2000-277661 A 10/2000
JP 2004-023192 A 1/2004

(Continued)

OTHER PUBLICATIONS

English translation of the International Preliminary Report on Patentability (Chapter I) dated Feb. 22, 2024 (Application No. PCT/JP2022/029941).

(Continued)

*Primary Examiner* — Benny T Lee
(74) *Attorney, Agent, or Firm* — Muncy, Geissler, Olds & Lowe, P.C.

(57) ABSTRACT

A waveguide device includes: a waveguide member capable of guiding an electromagnetic wave having a frequency of 30 GHz or more and 20 THz or less; a support substrate configured to support the waveguide member; and a low-dielectric constant portion. The waveguide member includes: an inorganic material substrate; and coplanar electrodes arranged above the inorganic material substrate. The support substrate is arranged below the inorganic material substrate. The low-dielectric constant portion is arranged below the inorganic material substrate, and has a dielectric constant smaller than a dielectric constant of the inorganic material substrate.

6 Claims, 21 Drawing Sheets

(58) Field of Classification Search
USPC ........................................................ 333/238
See application file for complete search history.

(56) References Cited

U.S. PATENT DOCUMENTS

| | | | |
|---|---|---|---|
| 11,677,373 | B2 | 6/2023 | Flemming et al. |
| 2020/0382089 | A1 | 12/2020 | Flemming et al. |

FOREIGN PATENT DOCUMENTS

| | | | |
|---|---|---|---|
| JP | 2018-023030 | A | 2/2018 |
| JP | 2021-509767 | A | 4/2021 |

OTHER PUBLICATIONS

International Search Report and Written Opinion (Application No. PCT/JP2022/029941) dated Oct. 25, 2022 (10 pages).
Katehi et al., "*Micromachined Circuits for Millimeter- and Sub-Millimeter-Wave Applications*," IEEE Antennas Propag. Mag., vol. 35, No. 5, pp. 9-17, Oct. 1993 (10 pages).
Milanovic et al., "*Micromachined Coplanar Waveguides in CMOS Technology*," IEEE Microwave and Guided Wave Letters, vol. 6, No. 10, pp. 380-382, Oct. 1996 (4 pages).
German Office Action (with English translation) dated Nov. 26, 2025 (Application No. 11 2022 002 926.9).
Correction to the German Office Action dated Jan. 26, 2026 (Application No. 11 2022 002 926.9).

* cited by examiner

WAVEGUIDE DEVICE INCLUDING A WAVEGUIDE MEMBER IN AN INORGANIC MATERIAL SUBSTRATE ATTACHED TO A SUPPORT SUBSTRATE AND WITH A LOW-LOSS DIELECTRIC PORTION

CROSS-REFERENCE TO RELATED APPLICATIONS

This application is a continuation under 35 U.S.C. 120 of International Application PCT/JP2022/029941 having the International Filing Date of 4 Aug. 2022 and having the benefit of the earlier filing dates of Japanese Application No. 2021-131758, filed on 12 Aug. 2021. Each of the identified applications is fully incorporated herein by reference.

BACKGROUND OF THE INVENTION

1. Field of the Invention

The present invention relates to a waveguide device.

2. Description of the Related Art

As a device for guiding a millimeter wave/terahertz wave, a waveguide device was developed. The waveguide device is expected to be applied and rolled out in a wide range of fields, such as optical waveguides, next-generation high-speed communication, sensors, laser processing, and solar power generation. As an example of such waveguide device, there is a proposal of a technology involving using a grounded coplanar waveguide including: a glass substrate having a thickness of 300 μm; a coplanar conductor arranged on the glass substrate; and a ground electrode arranged on a surface of the glass substrate on an opposite side to the coplanar conductor (i.e., Patent Literature 1).

When a waveguide device based on such technology is adopted in various industrial products, the mounting of the waveguide device on a support substrate, such as an IC substrate or a printed circuit board, is considered. However, when the waveguide device is mounted on the support substrate, a range in which low-propagation loss performance at a practical level can be achieved in a frequency region corresponding to waves ranging from a millimeter wave to a terahertz wave (i.e., in particular, a frequency region of 300 GHz or more) is narrow, and hence it is difficult to achieve excellent low-propagation loss performance over a wide frequency range.

CITATION LIST

Patent Literature

[PTL 1] JP 2021-509767 A published Apr. 1, 2021.

SUMMARY OF THE INVENTION

A primary object of the present invention is to provide a waveguide device, which can achieve excellent low-propagation loss performance over a wide frequency range in a high-frequency region of 30 GHz or more while having a configuration in which an inorganic material substrate is mounted on (i.e., supported by) a support substrate.

A waveguide device according to an embodiment of the present invention includes: a waveguide member capable of guiding an electromagnetic wave having a frequency of 30 GHz or more and 20 THz or less; a support substrate configured to support the waveguide member; and a low-dielectric constant portion. The waveguide member includes: an inorganic material substrate; and coplanar electrodes arranged above the inorganic material substrate. The support substrate is arranged below the inorganic material substrate. The low-dielectric constant portion is arranged below the inorganic material substrate, and has a dielectric constant smaller than a dielectric constant of the inorganic material substrate.

In one embodiment, a thickness of the inorganic material substrate satisfies the following formula (1):

$$t < \frac{\lambda}{a\sqrt{\varepsilon}} \tag{1}$$

where "t" represents the thickness of the inorganic material substrate, λ represents a wavelength of an electromagnetic wave guided by the waveguide member, ε represents a relative dielectric constant of the inorganic material substrate, and "a" represents a numerical value of 2.

In one embodiment, the support substrate has a recess, a lower surface of the inorganic material substrate and the recess of the support substrate define a cavity, and the cavity functions as the low-dielectric constant portion.

In one embodiment, the coplanar electrodes include a signal electrode extending in a predetermined direction, and ground electrodes each positioned in a direction intersecting the predetermined direction at a distance from the signal electrode. When a dimension of a respective gap between the signal electrode and each of the ground electrodes in the direction intersecting the predetermined direction is represented by "g", a dimension of the cavity in a thickness direction of the inorganic material substrate is equal to or more than "g".

In one embodiment, the waveguide device further includes an earth electrode positioned between the inorganic material substrate and the support substrate.

In one embodiment, the inorganic material substrate has a relative dielectric constant ε of 3.5 or more and 12 or less, and a dielectric loss tangent (i.e., dielectric loss) tan δ of 0.003 or less at 300 GHz.

In one embodiment, the inorganic material substrate is a quartz glass substrate.

According to the embodiment of the present invention, the waveguide device, which has excellent low-propagation loss performance over a wide frequency range in a high-frequency region of 30 GHz or more while having a configuration in which the inorganic material substrate is mounted on (i.e., supported by) the support substrate, can be achieved.

DETAILED DESCRIPTION OF THE EMBODIMENTS

Embodiments of the present invention are described below. However, the present invention is not limited to these embodiments.

A. Overall Configuration of Waveguide Device

A-1. Overall Configuration of Waveguide Device 100

Figure 1:
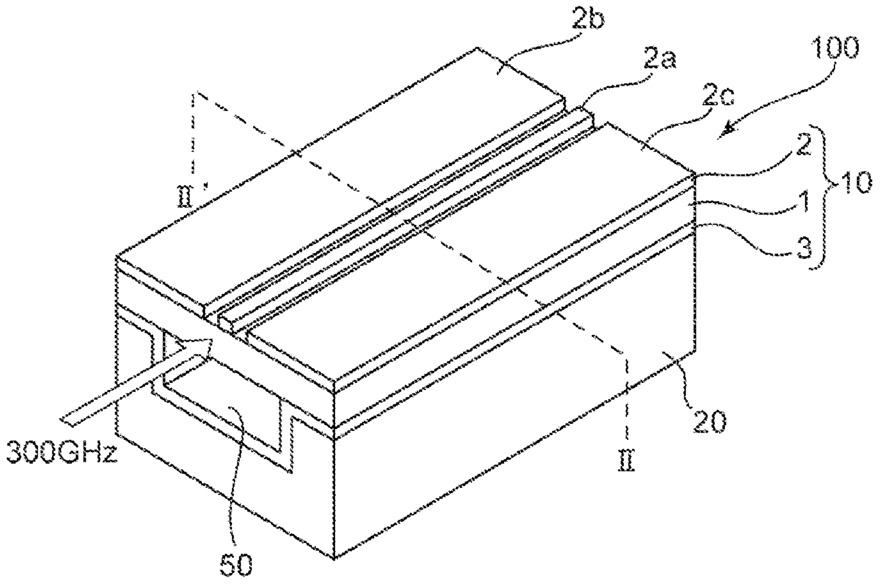
FIG. 1 is a schematic perspective view of a waveguide device according to an embodiment of the present invention.
Figure 2:
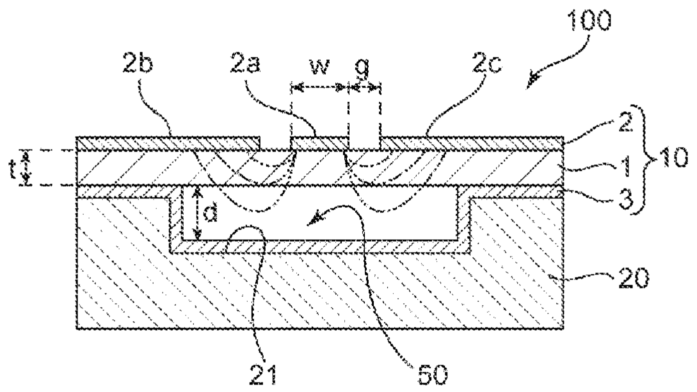
FIG. 2 is a cross-sectional view of the waveguide device taken along the line II-II' of FIG. 1.

FIG. 1 is a schematic perspective view of a waveguide device according to one embodiment of the present invention, and FIG. 2 is a cross-sectional view of the waveguide device taken along the line II-II' of FIG. 1.

A waveguide device 100 of the illustrated example includes a waveguide member 10, a support substrate 20, and a low-dielectric constant portion 50. The waveguide member 10 is capable of guiding an electromagnetic wave having a frequency of 30 GHz or more and 20 THz or less, i.e., an electromagnetic wave that is a millimeter wave/terahertz wave. The "millimeter wave" is typically an electromagnetic wave having a frequency of from about 30 GHz to about 300 GHz; and the "terahertz wave" is typically an electromagnetic wave having a frequency of from about 300 GHz to about 20 THz. In particular, the waveguide member 10 can guide an electromagnetic wave having a frequency of 30 GHz or more and 2 THz or less (i.e., in particular, an electromagnetic wave having a frequency of 30 GHz or more and 1 THz or less) while securing excellent low-propagation loss performance.

The waveguide member 10 forms a coplanar line, and includes: an inorganic material substrate 1; and coplanar electrodes 2 arranged above the inorganic material substrate 1.

The support substrate 20 is arranged below the inorganic material substrate 1, and is configured to support the waveguide member 10. The low-dielectric constant portion 50 is arranged below the inorganic material substrate 1, and has a dielectric constant smaller than the dielectric constant of the inorganic material substrate 1. The low-dielectric constant portion 50 is typically a low-refractive index portion having a refractive index smaller than the refractive index of the inorganic material substrate 1.

As described in detail later, in the waveguide member for forming the coplanar line, when a voltage is applied to the coplanar electrodes, an electric field is generated, and hence the above-mentioned high-frequency electromagnetic wave is coupled to the electric field to be propagated.

When the above-mentioned high-frequency electromagnetic wave (i.e., in particular, an electromagnetic wave having a frequency of 300 GHz or more) is guided with such a configuration in which the waveguide member is supported by the support substrate, the propagation loss of the waveguide device may remarkably increase due to the inducement of a slab mode and/or the occurrence of substrate resonance.

A structure in which the thickness of the inorganic material substrate on which the coplanar electrodes are arranged is made sufficiently thin is effective in suppressing an increase in propagation loss due to the slab mode or the substrate resonance. In this case, however, there arises a new problem in that the electromagnetic wave to be propagated leaks to the support substrate present below the inorganic material substrate, and hence the propagation loss due to the dielectric loss of the support substrate increases.

Meanwhile, when the low-dielectric constant portion is arranged below the inorganic material substrate on which the coplanar electrodes are arranged, the inducement of a slab mode and the occurrence of substrate resonance can be suppressed while an electric field is suppressed from leaking to the support substrate over a wide frequency range in the above-mentioned high-frequency region. Accordingly, the waveguide device can secure excellent low-propagation loss performance over a wide frequency range in the high-frequency region.

In addition, the development of a small waveguide device was advanced, and the integration of circuits is expected in the future. Accordingly, it is predicted that the downsizing of the waveguide member (i.e., line structure) is required. In the waveguide device, the waveguide member (i.e., line structure) is supported by the support substrate, and hence the thinning of the inorganic material substrate that the waveguide member includes can be achieved. As a result, the demand for downsizing can be dealt with while excellent low-propagation loss performance is achieved over a wide frequency range in the above-mentioned high-frequency region.

In one embodiment, the thickness of the inorganic material substrate 1 satisfies the following formula (1):

$$t < \frac{\lambda}{a\sqrt{\varepsilon}} \tag{1}$$

where "t" represents the thickness of the inorganic material substrate, λ represents the wavelength of an electromagnetic wave guided by the waveguide member, ε represents the relative dielectric constant of the inorganic material substrate, and "a" represents a numerical value of 2.

When the thickness of the inorganic material substrate satisfies the above-mentioned formula (1), a reduction in propagation loss in the case of guiding the above-mentioned high-frequency electromagnetic wave can be achieved.

In one embodiment, the relative dielectric constant E of the inorganic material substrate 1 at 300 GHz is typically 3.5 or more, and is typically 12.0 or less, preferably 10.0 or less, more preferably 5.0 or less.

The dielectric loss tangent (i.e., dielectric loss) tan δ of the inorganic material substrate 1 at 300 GHz is typically 0.0030 or less, preferably 0.0020 or less, more preferably 0.0015 or less.

When the relative dielectric constant ε and dielectric loss tangent (i.e., dielectric loss) tan δ of the inorganic material substrate fall within the above-mentioned ranges, excellent low-propagation loss performance can be stably achieved over a wide frequency range in the above-mentioned high-frequency region. The relative dielectric constant ε and the dielectric loss tangent (i.e., dielectric loss) tan δ may be measured by terahertz time-domain spectroscopy. In addition, herein, when the measurement frequency is not mentioned with regard to the relative dielectric constant and the dielectric loss tangent, the relative dielectric constant and the dielectric loss tangent are measured at 300 GHz.

The thickness of the inorganic material substrate 1 is specifically 1 μm or more, preferably 2 μm or more, more preferably 10 μm or more, still more preferably 20 μm or more, and is, for example, 300 μm or less, preferably 200 μm or less, more preferably 100 μm or less, still more preferably 70 μm or less. From the viewpoint of downsizing by a reduction in electrode size, the thickness of the inorganic material substrate 1 is particularly preferably 60 μm or less.

When the thickness of the inorganic material substrate 1 falls within the above-mentioned ranges, excellent low-propagation loss performance can be further stably achieved over a wide frequency range in the above-mentioned high-frequency region.

In one embodiment, the waveguide member 10 forms a grounded coplanar line, and includes an earth electrode 3. The earth electrode 3 is positioned between the inorganic material substrate 1 and the support substrate 20.

When the waveguide member includes the earth electrode, an electric field generated at the time of the application of a voltage to the coplanar electrodes can be stably suppressed from leaking to the support substrate, and the occurrence of substrate resonance can also be suppressed.

Figure 3:
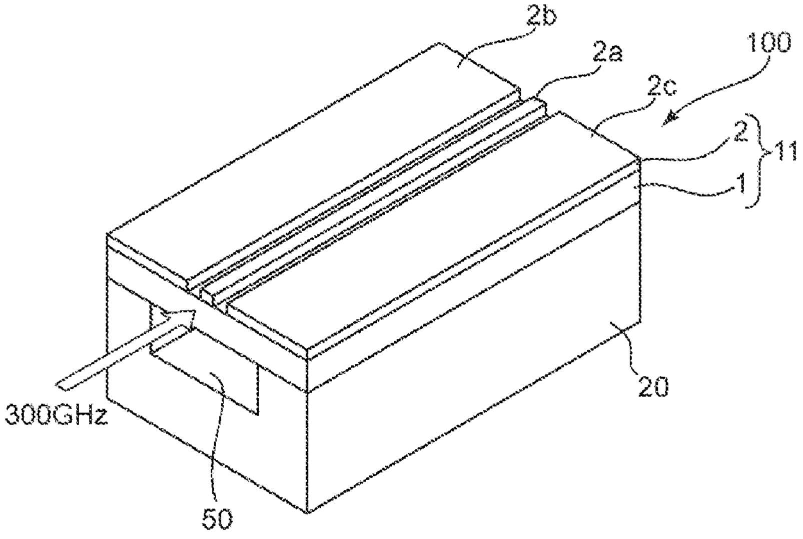
FIG. 3 is a schematic perspective view of a waveguide device according to another embodiment of the present invention.

Although the waveguide member 10 of the illustrated example forms the grounded coplanar line, the waveguide member of the present invention may be free of any earth electrode like a waveguide member 11 illustrated in FIG. 3.

As Illustrated in FIG. 2, in one embodiment, the coplanar electrodes 2 include a signal electrode 2*a*, a first ground electrode 2*b*, and a second ground electrode 2*c*. The signal electrode 2*a* has a line shape extending in a predetermined direction (i.e., waveguide direction of the waveguide member). A width (i.e., dimension in a direction perpendicular to the waveguide direction) w of the signal electrode 2*a* is, for example, 2 μm or more, preferably 20 μm or more, and is, for example, 200 μm or less, preferably 150 μm or less. The first ground electrode 2*b* is arranged at a distance from the signal electrode 2*a* in a direction intersecting (i.e., preferably, perpendicular to) the longitudinal direction of the signal electrode 2*a*. The second ground electrode 2*c* is positioned on the opposite side to the first ground electrode 2*b* with respect to the signal electrode 2*a* in the direction intersecting (i.e., preferably, perpendicular to) the longitudinal direction of the signal electrode 2*a*, and is arranged at a distance from the signal electrode 2*a*. Thus, a clearance (i.e., gap) extending in the longitudinal direction of the signal electrode 2*a* is formed between the signal electrode 2*a* and each of the ground electrodes 2*b* and 2*c*. A width (i.e., dimension in a direction intersecting the longitudinal direction) g of the clearance (i.e., gap) is, for example, 2 μm or more, preferably 5 μm or more, and is, for example, 100 μm or less, preferably 80 μm or less.

Figure 6:
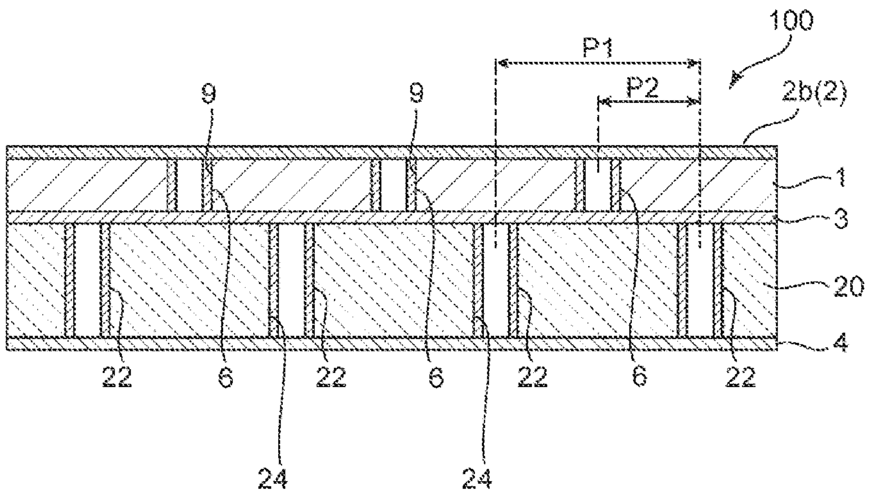
FIG. 6 is a schematic cross-sectional view for illustrating a modification of the waveguide device of FIG. 2.

In addition, as illustrated in FIG. 6, the ground electrodes 2*b* and 2*c*, and the earth electrode 3 may be electrically connected to each other. When the ground electrodes 2*b* and 2*c*, and the earth electrode 3 are electrically connected to each other, grounding can be strengthened, and hence stray capacitance due to a surrounding line or device can be suppressed.

In the illustrated example, a plurality of via holes 9 are formed in the inorganic material substrate 1, and the ground electrodes and the earth electrode are short-circuited to each other by vias 6 positioned in the respective via holes 9. The arrangement of the plurality of vias 6 (i.e., via holes) is not particularly limited. In the illustrated example, the plurality of vias 6 (i.e., via holes) are arranged in the longitudinal direction of the signal electrode 2*a*. The vias 6 are each typically a conductive film formed over the entire inner surface of the corresponding via hole. Each of the vias 6 includes a conductive material, and typically includes the same metal (i.e., described later) as that of each of the coplanar electrodes 2. The entirety of the inside of each of the via holes may be filled with the conductive material. When the vias are each formed from a metal film, the inside of each of the holes may be filled with the conductive material. The conductive material may be the same metal as that of each of the vias, or may be a different material such as a conductive paste.

The waveguide device 100 may further include a second earth electrode 4. The earth electrode 3 is hereinafter sometimes referred to as "first earth electrode 3." In addition, the earth electrode 3 may be referred to as "first metal layer," and the second earth electrode 4 may be referred to as "second metal layer." The second earth electrode 4 is positioned on the opposite side to the first earth electrode 3 with respect to the support substrate 20. In the illustrated example, the second earth electrode 4 is formed on the surface of the support substrate 20 on the opposite side to the first earth electrode 3, and is brought into direct contact with the support substrate 20. With such a configuration, the first earth electrode is arranged between the inorganic material substrate and the support substrate, and the second earth electrode is arranged on the opposite side to the first earth electrode with respect to the support substrate, and hence an electromagnetic wave can be further suppressed from leaking to the support substrate.

The waveguide device 100 may include through-substrate vias 22 that electrically connect the first earth electrode 3 and the second earth electrode 4 to each other. The waveguide device 100 illustrated in FIG. 6 separately includes the vias 6, which connect the first earth electrode 3 and the ground electrodes of the coplanar electrodes 2 to each other, and the through-substrate vias 22, which connect the first earth electrode 3 and the second earth electrode 4 to each other. Thus, grounding can be further strengthened, and hence stray capacitance due to a surrounding line or device can be stably suppressed.

As illustrated in each of FIG. 1 and FIG. 2, in one embodiment, the low-dielectric constant portion 50 is a cavity. In other words, the cavity functions as the low-dielectric constant portion 50 (i.e., low-refractive index portion). More specifically, the support substrate 20 has a recess 21, and the cavity is defined by the lower surface of the inorganic material substrate 1 and the recess 21 of the support substrate 20. Typically, the recess 21 is recessed downward from the upper surface of the support substrate 20, and extends in the same direction as that of the signal electrode 2*a*. When the earth electrode 3 is arranged on the inner surface of the recess 21, the cavity may be defined by the lower surface of the inorganic material substrate 1 and the earth electrode 3 arranged on the inner surface of the recess 21. In one embodiment, the cavity (i.e., low-dielectric constant portion) 50 is arranged so as to overlap at least part of the signal electrode in the thickness direction of the inorganic material substrate 1.

The low-dielectric constant portion is preferably a portion having a dielectric constant of less than 3.5, and may be, for example, $SiO_2$, magnesium fluoride, calcium fluoride, or a low-dielectric constant polymer (e.g., a Teflon®, a fluorinated polymer having a relative dielectric constant of 2.3).

In the case where the low-dielectric constant portion is a cavity, as compared to the case where the low-dielectric constant portion includes any other material, an electromagnetic wave propagating in the waveguide member can be more stably suppressed from leaking from the waveguide member, and a propagation loss (i.e., dielectric loss) in the low-dielectric constant portion can be further suppressed.

As illustrated in FIG. 2, in one embodiment, the lower limit value of the dimension “d” of the cavity in the thickness direction of the inorganic material substrate 1 is equal to or more than the width “g” of the clearance (i.e., gap), preferably 2g or more. The upper limit value of the dimension “d” of the cavity in the thickness direction of the inorganic material substrate 1 is 20g or less, preferably 5g or less.

When the dimension of the cavity is equal to or more than the above-mentioned lower limits, a further reduction in propagation loss in the case where the above-mentioned high-frequency electromagnetic wave is guided can be achieved.

In addition, in one embodiment, the lower limit value of the dimension of the cavity in the widthwise direction (i.e., direction perpendicular to the waveguide direction) of the inorganic material substrate 1 is equal to or more than the width “w” of the signal electrode, preferably equal to or more than the value of the expression “width “w” of signal electrode+width “g” of clearance (i.e., gap)×2.” The upper limit value of the dimension of the cavity in the widthwise direction of the inorganic material substrate 1 is equal to or less than the value of the expression “width “w” of signal electrode+width “g” of clearance (i.e., gap)×40,” preferably equal to or less than the value of the expression “width “w” of signal electrode+width “g” of clearance (i.e., gap)×20.”

When the low-dielectric constant portion is a portion without a cavity, the low-dielectric constant portion formed from any one of the above-mentioned materials may be arranged in the recess 21 of the support substrate 20.

Figure 4:
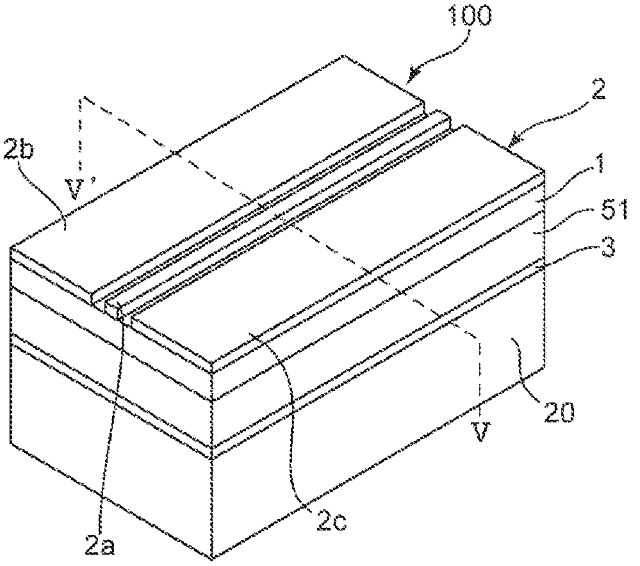
FIG. 4 a schematic perspective view of a waveguide device according to still another embodiment of the present invention.
Figure 5:
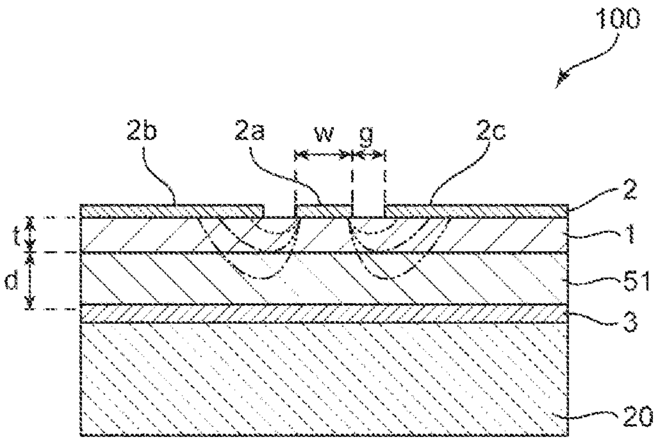
FIG. 5 is a cross-sectional view of the waveguide device taken along the line V-V' of FIG. 4.

In addition, as illustrated in each of FIG. 4 and FIG. 5, the following is permitted: the support substrate 20 is free of the recess 21, and a low-dielectric constant portion 51 formed from any one of the above-mentioned materials is arranged between the inorganic material substrate 1 and the support substrate 20. In the illustrated example, the low-dielectric constant portion 51 is formed in a layered manner, and is sandwiched between the inorganic material substrate 1 and the earth electrode 3. The ranges of the dimension “d” of the low-dielectric constant portion 51 in the thickness direction of the inorganic material substrate 1 are the same as the ranges of the dimension “d” of the cavity in the thickness direction of the inorganic material substrate 1 described above.

A-2. Overall Configuration of Waveguide Device 101

Figure 7:
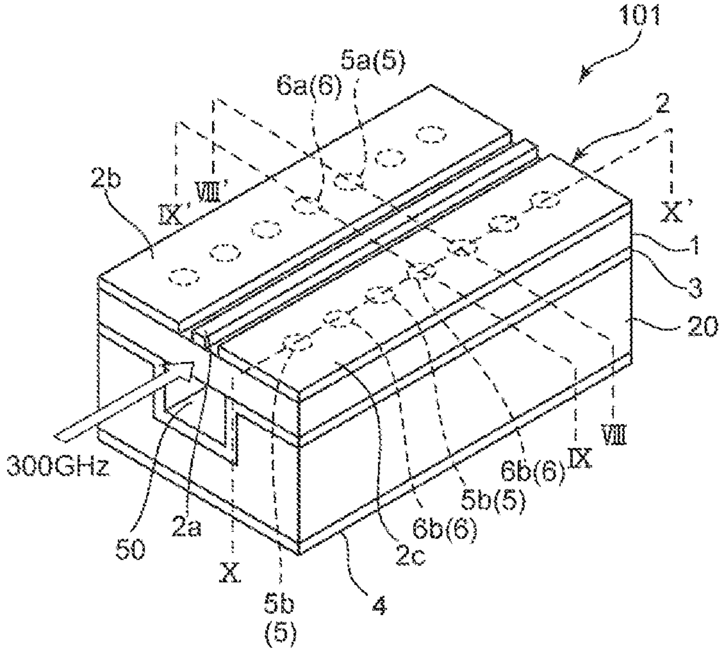
FIG. 7 is a schematic perspective view of a waveguide device according to still another embodiment of the present invention.
Figure 8:
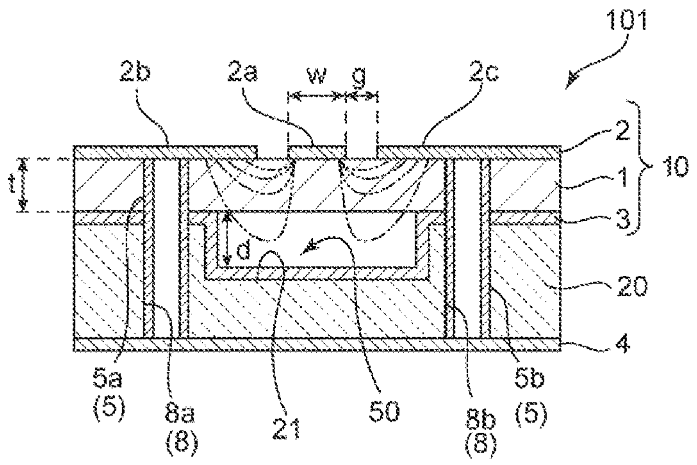
FIG. 8 is a cross-sectional view of the waveguide device taken along the line VIII-VIII' of FIG. 7.
Figure 9:
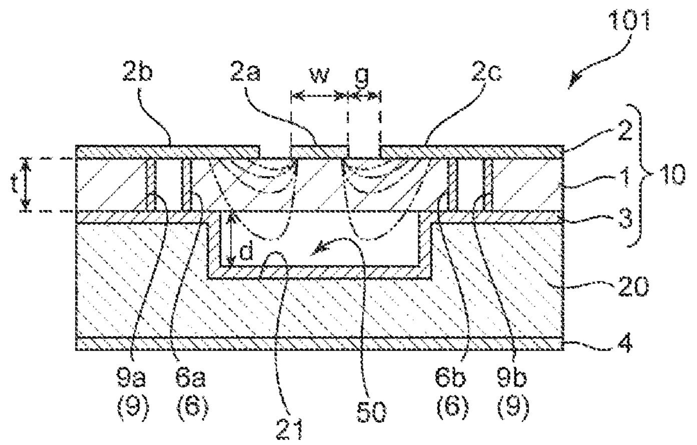
FIG. 9 is a cross-sectional view of the waveguide device taken along the line IX-IX' of FIG. 7.
Figure 10:
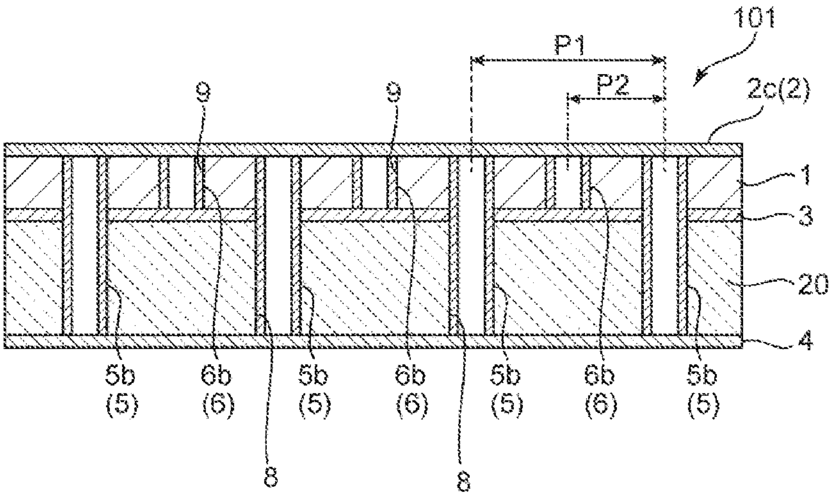
FIG. 10 is a cross-sectional view of the waveguide device taken along the line X-X' of FIG. 7.

FIG. 7 is a schematic perspective view of a waveguide device according to another embodiment of the present invention, FIG. 8 is a cross-sectional view of the waveguide device taken along the line VIII-VIII' of FIG. 7, FIG. 9 is a cross-sectional view of the waveguide device taken along the line IX-IX' of FIG. 7, and FIG. 10 is a cross-sectional view of the waveguide device taken along the line X-X' of FIG. 7.

As illustrated in FIGS. 7-9, a waveguide device 101 of the illustrated example further includes a first via 5 and a second via 6 in addition to the above-mentioned inorganic material substrate 1, the above-mentioned coplanar electrodes 2, the above-mentioned first earth electrode 3, the above-mentioned support substrate 20, and the above-mentioned second earth electrode 4. The waveguide device 101 may include a joining portion to be described later, though the portion is not shown.

In one embodiment, the first via 5 electrically connects each ground electrode of the coplanar electrodes 2 and the second earth electrode 4 to each other, and is electrically connected to the first earth electrode 3. The waveguide device 101 includes the plurality of first vias 5 described above. The second via 6 electrically connects the first earth electrode 3 and the ground electrode to each other. The second via 6 is arranged between the first vias 5 adjacent to each other out of the plurality of first vias 5. With such a configuration, the first vias electrically connect the first earth electrode, the second earth electrode, and the ground electrodes of the coplanar electrodes to each other. Accordingly, grounding can be further strengthened, and hence stray capacitance due to a surrounding line or device can be more stably suppressed. In addition, an excellent heat-dissipating function can be imparted to the support substrate, and signal transmission in a high-order mode can be suppressed. In addition, relative positional accuracy between a portion in each of the first vias, which is positioned between the first earth electrode and the corresponding ground electrode, and a portion therein, which is positioned between the first earth electrode and the second earth electrode, can be simply achieved. Accordingly, the occurrence of a ripple can be suppressed as compared to the case where the vias, which connect the first earth electrode and the ground electrodes to each other, and the vias, which connect the first earth electrode and the second earth electrode to each other, are separately arranged (see FIG. 6). In addition, the waveguide device 101 including the first vias 5 can be smoothly produced as compared to the waveguide device 100 illustrated in FIG. 6.

Further, the second via is arranged between the first vias adjacent to each other, and hence a pitch between each of the first vias and the second via in the inorganic material substrate can be made smaller than a pitch between the first vias in the support substrate. Accordingly, even when the inorganic material substrate is thinned, the strength of the inorganic material substrate can be sufficiently achieved.

A-2-1. First Vias

As illustrated in FIG. 7, in the waveguide device 101, the first vias 5 are arranged on both the sides of the signal electrode 2*a* in a direction intersecting (i.e., preferably, perpendicular to) the longitudinal direction of the signal electrode 2*a*. Hereinafter, the first via, which electrically connects the first ground electrode 2*b* and the second earth electrode 4 to each other, and the first via, which electrically connects the second ground electrode 2*c* and the second earth electrode 4 to each other, may be distinguished from each other by being referred to as "first via 5*a*" and "first via 5*b*," respectively.

As illustrated in FIG. 8, the first via 5*a* is brought into contact with the first ground electrode 2*b* and the second earth electrode 4, and continuously extends between the first ground electrode 2*b* and the second earth electrode 4. The first via 5*b* is brought into contact with the second ground electrode 2*c* and the second earth electrode 4, and continuously extends between the second ground electrode 2*c* and the second earth electrode 4. Each of the first vias 5*a* and 5*b* penetrates through the first earth electrode 3, and is brought into contact with the first earth electrode 3. The waveguide device may include only one of the first via 5*a* or 5*b*.

The first vias 5 are each typically a conductive film. Each of the first vias 5 includes a conductive material, and typically includes the same metal (i.e., described later) as that of each of the coplanar electrodes 2. The shape of each of the first vias 5 corresponds to the shape of a first via hole 8 in which the via is arranged. In other words, the waveguide device 101 includes a plurality of the first via holes 8 in correspondence with the plurality of first vias 5. The first via holes 8 each penetrate through the inorganic material substrate 1, the first earth electrode 3, and the support substrate 20. The first via holes 8 each typically have a circular shape when viewed from above the inorganic material substrate 1. When the first via holes each have a circular shape, the inner diameter of each of the first via holes is, for example, 10 μm or more, preferably 20 μm or more, and is, for example, 200 μm or less, preferably 100 μm or less, more preferably 80 μm or less.

In FIG. 8, each of the first via holes 8 has a circular shape when viewed from above the inorganic material substrate 1, and linearly penetrates through the inorganic material substrate 1, the first earth electrode 3, and the support substrate 20 in the thickness direction of the inorganic material substrate 1. In the case where the first via holes are circular and linear, the first vias 5 each have a columnar shape or a cylindrical shape extending in the thickness direction of the inorganic material substrate 1. In this case, the ranges of the outer diameter of each of the first vias 5 are the same as the ranges of the inner diameter of each of the first via holes described above.

Figure 11:
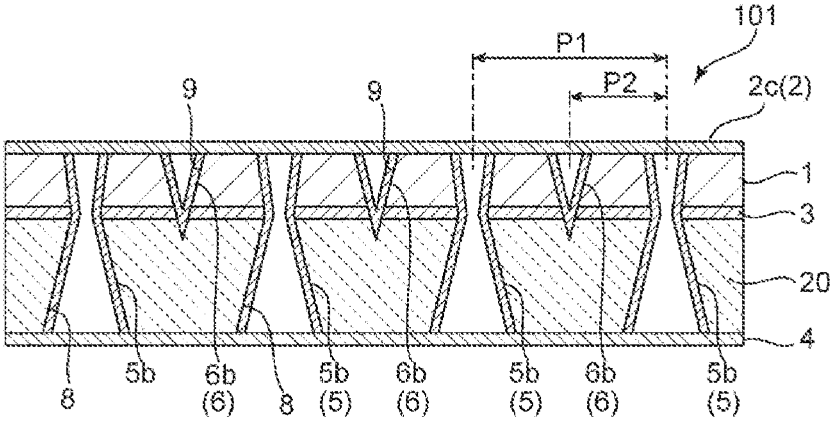
FIG. 11 is a schematic cross-sectional view for illustrating a modification of the shape of each of vias in the waveguide device of FIG. 7.

As illustrated in FIG. 11, each of the first via holes 8 may have a circular shape when viewed from above the inorganic material substrate 1, and have such a tapered shape that the diameter becomes smaller as the distance from the first earth electrode 3 becomes shorter. In addition, each of the first via holes 8 may have a circular shape when viewed from above the inorganic material substrate 1, and have such a tapered shape that the diameter becomes larger as the distance from the earth electrode 3 becomes shorter, though the tapered shape is not shown.

When the first via holes each have a tapered shape, the following features can be imparted to each of the via holes: it becomes easier to form the conductive film in the first via; and it becomes easier to achieve the strength of the support substrate. In addition, the first vias may be formed so that the conductive material may be embedded in each of the first via holes.

When the first via holes each have a circular shape and a tapered shape, the first vias 5 each preferably have such an hourglass shape that the portion in contact with the first earth electrode 3 has a small diameter, and the diameter becomes larger as the distance from the first earth electrode 3 becomes longer. In other words, the first vias 5 each preferably have a shape obtained by linking the apices of two cones to each other. In this case, the maximum outer diameter of each of the first vias 5 falls within the above-mentioned ranges. In one embodiment, the outer diameter of one end portion of each of the first vias 5 in contact with the corresponding ground electrode is smaller than the outer diameter of the other end portion of the first via 5 in contact with the second earth electrode. In each of the first vias 5, a taper angle on the coplanar electrodes 2 side with respect to the first earth electrode is smaller than a taper angle on the second earth electrode side with respect to the first earth electrode.

In the illustrated example, the ground electrodes of the coplanar electrodes and the second earth electrode are each formed so as to close the first via holes. However, the configurations of the ground electrodes and the second earth electrode are not limited thereto. Each of the ground electrodes and the second earth electrode only needs to be conducted to the first vias, and may be opened without closing the first via holes.

A pitch P1 between the plurality of first vias 5*a* (i.e., distance between the centers of the first vias 5 adjacent to each other) is, for example, 40 μm or more, preferably 60 μm or more, and is, for example, 600 μm or less, preferably 400 μm or less, more preferably 200 μm or less.

Figure 13:
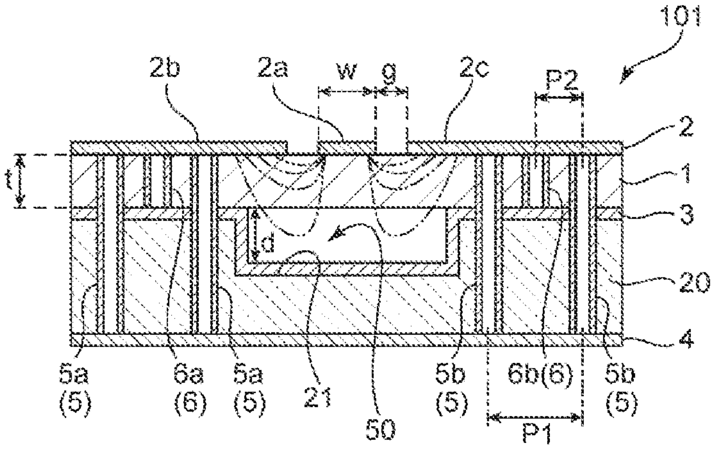
FIG. 13 is a schematic cross-sectional view for illustrating a modification of the arrangement of the vias in the waveguide device of FIG. 7.

In addition, in the waveguide device 101 illustrated in each of FIG. 7 to FIG. 11, the plurality of first vias 5 are arranged at a distance from each other in the longitudinal direction of the signal electrode 2*a*. The direction in which the plurality of first vias 5 are arranged is not limited to the longitudinal direction of the signal electrode 2*a*. As illustrated in FIG. 13, the plurality of first vias 5 may be arranged at a distance from each other in a direction intersecting (i.e., preferably, perpendicular to) the longitudinal direction of the signal electrode 2*a*. In addition, the waveguide device may include, in the direction intersecting (i.e., perpendicular to) the longitudinal direction of the signal electrode 2*a*, a plurality of rows of the first vias 5 arranged in the longitudinal direction of the signal electrode 2*a*.

A-2-2. Second Vias

As illustrated in FIG. 7, in the waveguide device 101, the second vias 6 are arranged on both the sides of the signal electrode 2*a* in a direction intersecting (i.e., preferably, perpendicular to) the longitudinal direction 41 the signal electrode 2*a*. Hereinafter, the second via, which electrically connects the first ground electrode 2*b* and the first earth electrode 3 to each other, and the second via, which electrically connects the second ground electrode 2*c* and the first earth electrode 3 to each other, may be distinguished from each other by being referred to as "second via 6*a*" and "second via 6*b*," respectively. The second via 6*a* is brought into contact with the first ground electrode 2*b* and the first earth electrode 3, and does not contact the second earth electrode 4. The second via 6*b* is brought into contact with the second ground electrode 2*c* and the first earth electrode 3, and does not contact the second earth electrode 4. The waveguide device may include only one of the second via 6*a* or 6*b*.

The second vias 6 are each typically a conductive film. Each of the second vias 6 includes a conductive material, and typically includes the same metal (described later) as that of each of the first vias 5. The shape of each of the second vias 6 corresponds to the shape of a second via hole 9 in which the via is arranged. In other words, the waveguide device 101 includes the second via holes 9 corresponding to the second vias 6.

As illustrated in FIG. 9, each of the second via holes 9 penetrates through at least the inorganic material substrate 1, and does not penetrate through the support substrate 20. The second via holes 9 each typically have a circular shape when viewed from above the inorganic material substrate 1. When the second via holes each have a circular shape, the ranges of the inner diameter of each of the second via holes are the same as, for example, the ranges of the inner diameter of each of the first via holes described above.

Each of the second via holes 9 of the illustrated example linearly penetrates through the inorganic material substrate 1 in the thickness direction of the inorganic material substrate 1, and does not penetrate through the first earth electrode 3. In the case where the second via holes 9 are circular and linear, the second vias 6 each have a columnar shape or a cylindrical shape extending in the thickness direction of the inorganic material substrate 1. In this case, the ranges of the outer diameter of each of the second vias 6 are the same as the ranges of the inner diameter of each of the second via holes described above.

As illustrated in FIG. 11, the second via holes 9 may each have a conical shape that tapers as the distance from the coplanar electrodes 2 becomes longer. Each of the second via holes 9 of the illustrated example penetrates through the inorganic material substrate 1 and the first earth electrode 3, and the tip reaches the support substrate 20. In the case where the second via holes 9 have conical shapes, the second vias 6 preferably have the same conical shapes as those of the second via holes 9. In this case, the maximum outer diameter of each of the second vias 6 falls within the ranges of the inner diameter of each of the second via holes described above. In addition, the apex portions of the second vias 6 (i.e., end portions of the second vias 6 on the opposite side to the coplanar electrodes 2) may reach the support substrate 20.

In the illustrated example, the ground electrodes are formed so as to close the second via holes. However, the configurations of the ground electrodes are not limited thereto. Each of the ground electrodes only needs to be conducted to the second vias, and may be opened without closing the second via holes.

As illustrated in each of FIG. 10 to FIG. 13, the second vias 6 are each arranged between the first vias 5 adjacent to each other out of the plurality of first vias 5 arranged in a predetermined direction. The second vias 6 are each typically positioned at the center of an interval between the first vias 5 adjacent to each other.

The waveguide device 101 of the illustrated example includes the plurality of second vias 6 (i.e., the plurality of second vias **6*a* and the plurality of second vias 6*b*). The second vias 6 illustrated in each of FIG. 7 to FIG. 12 are each arranged between the first vias 5 adjacent to each other in the longitudinal direction of the signal electrode 2*a*. The second vias 6 illustrated in FIG. 13 are each arranged between the first vias 5 adjacent to each other in a direction intersecting (preferably, perpendicular to) the longitudinal direction of the signal electrode 2*a***.

Figure 12:
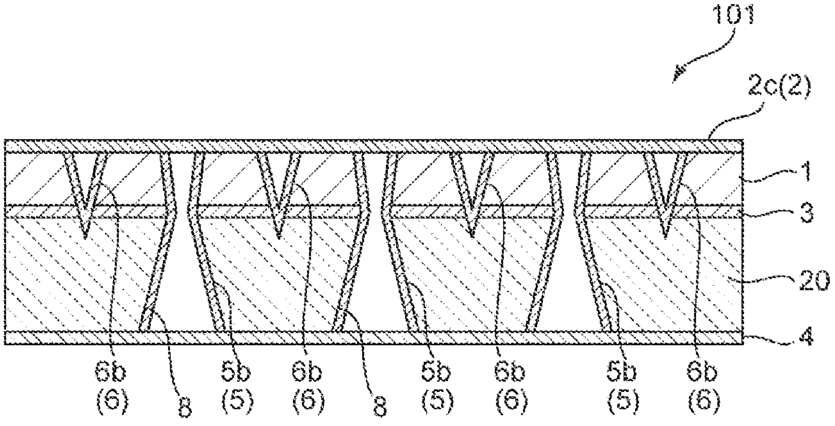
FIG. 12 is a schematic cross-sectional view for illustrating a modification of the arrangement of the vias in the waveguide device of FIG. 11.

In addition, each of the second vias 6 may be arranged at any appropriate position as long as the via is present between the first vias 5 adjacent to each other. The second vias 6 may each be arranged every "n" first vias 5 in the direction in which the plurality of first vias are arranged. "n" represents, for example, 1 or more and 5 or less, preferably 1 or 2. It is more preferred that the first vias 5 and the second vias 6 should be alternately arranged. In addition, all of the plurality of second vias 6 may each be arranged between the first vias 5 adjacent to each other as illustrated in each of FIG. 10 and FIG. 11, or the second via 6 that is not arranged between the first vias 5 may be present as illustrated in FIG. 12 as long as at least one of the vias is arranged between the first vias 5 adjacent to each other.

As illustrated in FIG. 11, a pitch P2 between the first via 5 and the second via 6 adjacent to each other (i.e., distance between the centers of the first via 5 and the second via 6 adjacent to each other) is substantially ½ of the pitch P1 (i.e., distance between the centers of the first vias 5 adjacent to each other), and the pitch is, for example, 25 μm or more, preferably 60 μm or more, and is, for example, 600 μm or less, preferably 400 μm or less, more preferably 200 μm or less.

When the second vias 6 are each arranged between the first vias 5 adjacent to each other as described above, the pitch P2 between the first via 5 and the second via 6 in the inorganic material substrate 1 can be made smaller than the pitch P1 between the first vias 5 in the support substrate 20. Accordingly, even when the inorganic material substrate is thinned, the strength of the inorganic material substrate can be sufficiently achieved.

A-2-3. Modification of Waveguide Device 101

Figure 14:
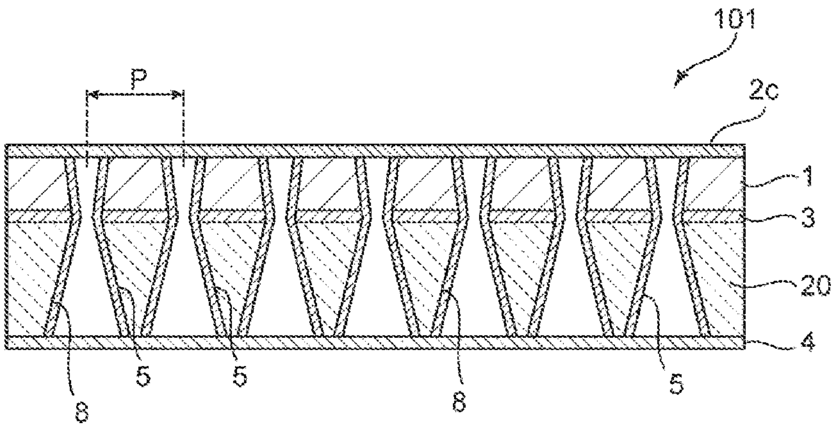
FIG. 14 is a schematic cross-sectional view for illustrating a modification of the configuration of each of the vias in the waveguide device of FIG. 11.

In addition, as illustrated in FIG. 14, the waveguide device 101 may be free of the second via 6 while including the first vias 5. However, when the first via holes 8 each have such a tapered shape that the diameter becomes larger as the distance from the first earth electrode 3 becomes longer, and the thickness of the support substrate 20 is larger than that of the inorganic material substrate 1 as illustrated in FIG. 14, the outer diameter of one end portion of each of the first vias 5 in contact with the corresponding ground electrode becomes smaller than the outer diameter of the other end portion of the first via 5 in contact with the second earth electrode 4 in some cases. In such cases, when a pitch P between the plurality of first vias 5 is narrowed like the above-mentioned pitch P2 without the arrangement of the second via 6, the other end portions of the first vias 5 may interfere with each other. Accordingly, it is preferred that the waveguide device 101 include the first vias 5 and the second vias 6, and the second vias 6 be each arranged between the first vias 5 adjacent to each other because the interference between the first vias 5 can be suppressed.

A-3. Overall Configuration of Waveguide Device 102

Figure 15:
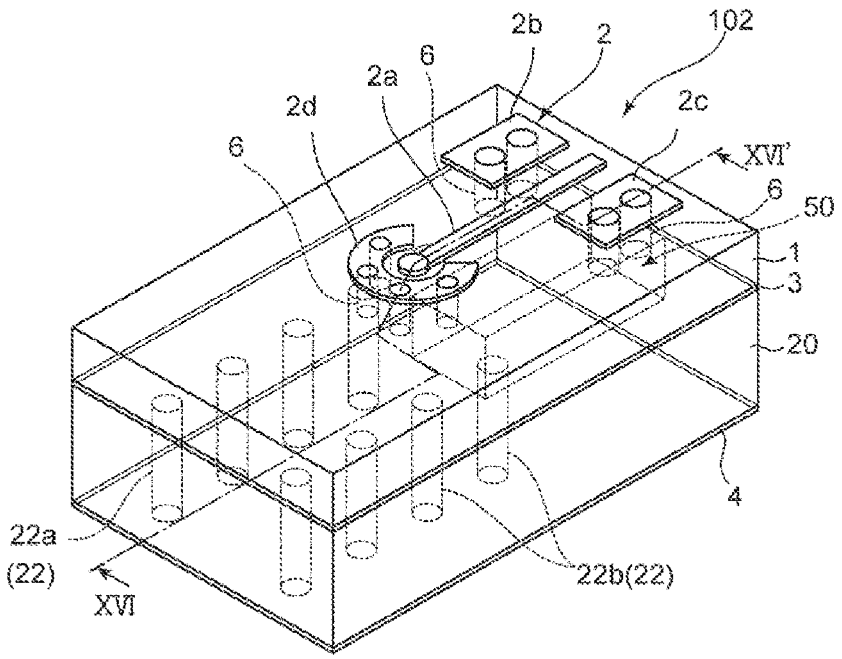
FIG. 15 is a schematic perspective view of a waveguide device according to still another embodiment of the present invention.
Figure 16:
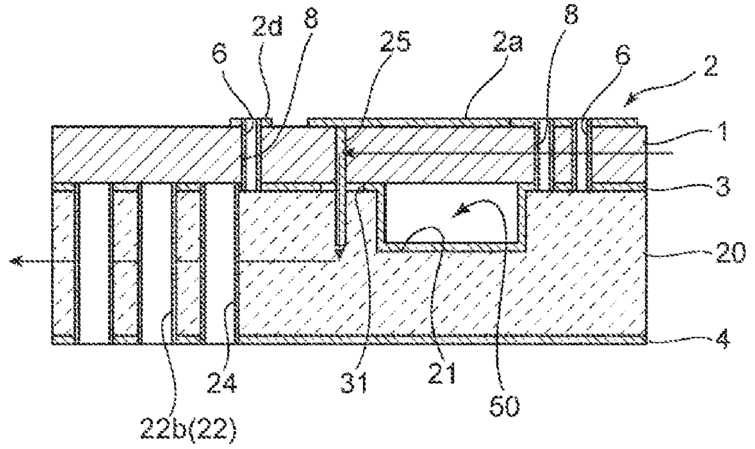
FIG. 16 is a cross-sectional view of the waveguide device taken along the line XVI-XVI' of FIG. 15.
Figure 17:
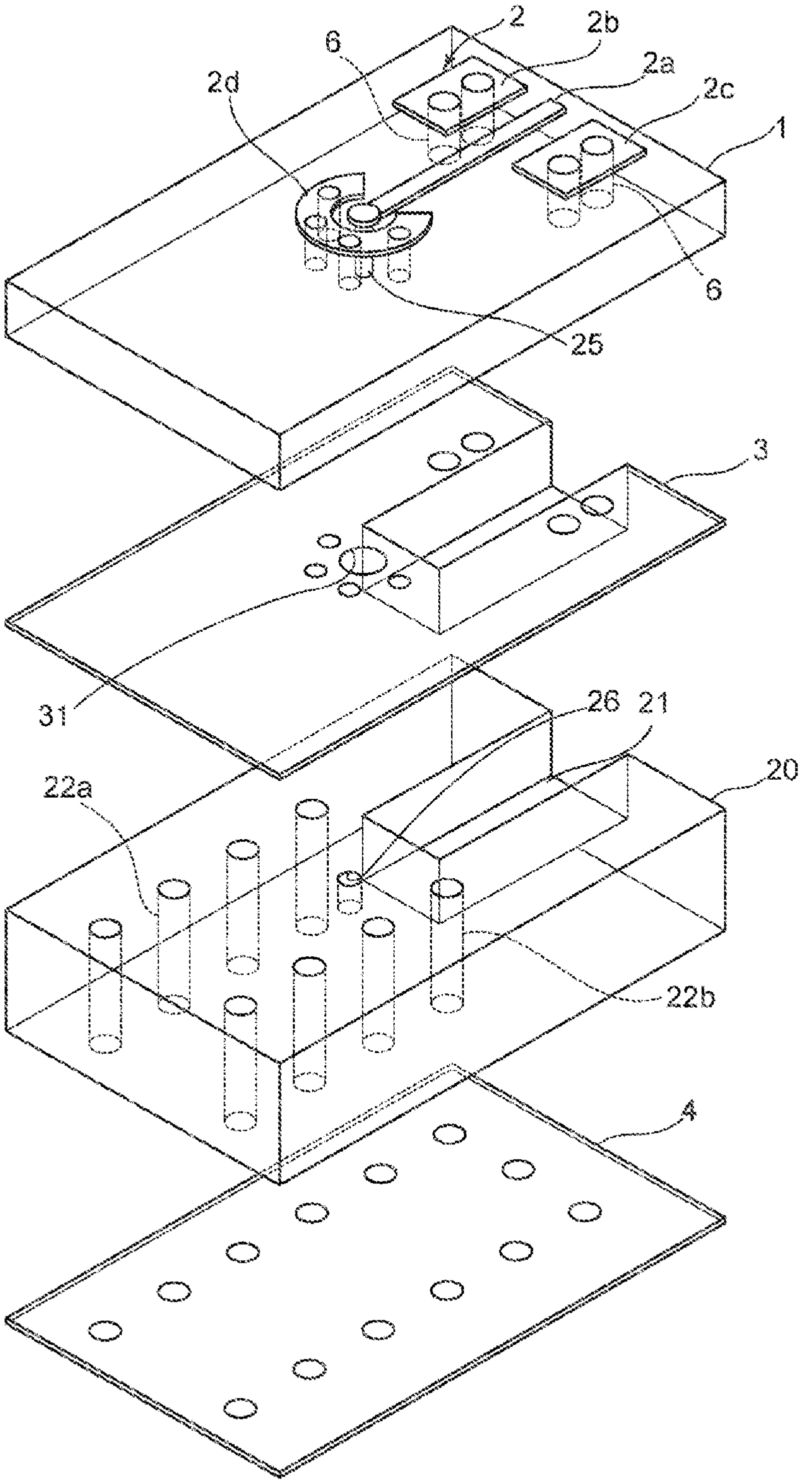
FIG. 17 is an exploded perspective view of the waveguide device of FIG. 15.

FIG. 15 is a schematic perspective view of a waveguide device according to still another embodiment of the present invention, FIG. 16 is a cross-sectional view of the waveguide device taken along the line XVI-XVI' of FIG. 15, and FIG. 17 is an exploded perspective view of the waveguide device of FIG. 15.

A waveguide device 102 of the illustrated example further includes the plurality of through-substrate vias 22 in addition to the above-mentioned inorganic material substrate 1, the above-mentioned coplanar electrodes 2, the above-mentioned first earth electrode 3, the above-mentioned support substrate 20, and the above-mentioned second earth electrode 4. The waveguide device 102 may include a joining portion to be described later, though the portion is not shown.

The plurality of through-substrate vias 22 each electrically connect the first earth electrode 3 and the second earth electrode 4 to each other. The first earth electrode 3, the second earth electrode 4, and the plurality of through-substrate vias 22 form a substrate-integrated waveguide (i.e., hereinafter referred to as "SIW") that can propagate an electromagnetic wave. Thus, the SIW can be arranged in the support substrate, and hence the support substrate can be effectively utilized as a waveguide.

In one embodiment, the coplanar electrodes 2 further include a third ground electrode 2*d* in addition to the signal electrode 2*a*, the first ground electrode 2*b*, and the second ground electrode 2*c* described above. In this embodiment, one end portion of the signal electrode 2*a* is positioned between the first ground electrode 2*b* and the second ground electrode 2*c* arranged at a distance from each other. The first ground electrode 2*b* and the second ground electrode 2*c* may be electrically connectable to an external device (i.e., not shown). The third ground electrode 2*d* is arranged at a predetermined distance from the other end portion of the signal electrode 2*a*. The third ground electrode 2*d* has a substantially C-shape when viewed from above, and surrounds the other end portion of the signal electrode 2*a*. The coplanar electrodes 2 may be free of the third ground electrode 2*d*.

In addition, the waveguide device 102 may further include the above-mentioned vias 6. Thus, grounding can be strengthened, and hence stray capacitance due to a surrounding line or device can be suppressed. In the illustrated example, the ground electrodes 2*b*, 2*c*, and 2*d* are each electrically connected to the first earth electrode 3 by the plurality of vias 6.

The plurality of through-substrate vias 22 each penetrate through the support substrate 20 in the thickness direction, and are periodically arranged in the support substrate 20. The plurality of through-substrate vias 22 typically include a first via row 22*a* and a second via row 22*b*. Each of the first via row 22*a* and the second via row 22*b* is formed of a plurality of through-substrate vias 22 arranged at a distance from each other in a predetermined direction. The second via row 22*b* is positioned away from the first via row 22*a* in a direction perpendicular to the direction in which the first via row 22*a* extends. In one embodiment, an area in the support substrate 20 surrounded by the first earth electrode 3, the second earth electrode 4, the first via row 22*a*, and the second via row 22*b* functions as the SIW. In the illustrated example, the cavity (i.e., low-dielectric constant portion) 50 is in line with the SIW in the direction in which the first via row 22*a* extends.

As illustrated in FIG. 16, each of the through-substrate vias 22 includes a conductor material, and typically includes the same metal (described later) as that of each of the coplanar electrodes 2. The through-substrate vias 22 are each arranged in a substrate via hole 24. That is, the waveguide device 102 has a plurality of the substrate via holes 24 in correspondence to the plurality of through-substrate vias 22. In the illustrated example, the substrate via holes 24 penetrate through the first earth electrode 3, the support substrate 20, and the second earth electrode 4 collectively. The through-substrate vias 22 are each typically a conductive film formed over the entire inner surface of the substrate via hole 24. The substrate via holes 24 may penetrate through only the support substrate without penetrating through the first earth electrode and the second earth electrode. In this case, the through-substrate vias are caused to fill the substrate via holes in such a manner as to be brought into contact with the first earth electrode and the second earth electrode. In addition, when the through-substrate vias 22 for conducting the first earth electrode 3 and the second earth electrode 4 to each other are each formed from a conductor film, the inside thereof may be filled with a material such as a resin.

In the waveguide device 102, a transmission line formed by the signal electrode 2*a* and the SIW may be independent of each other, or may be coupled to each other so as to enable an electromagnetic wave to be propagated. In one embodiment, a transmission line (i.e., coplanar transmission line) formed by each of the coplanar electrodes 2 and the SIW are coupled to each other by a conductor pin 25. Thus, the propagation mode of the electromagnetic wave can be converted between a transmission line mode and a waveguide mode. For example, an electromagnetic wave (i.e., signal) in the transmission line mode propagating through the inorganic material substrate can be converted via the conductor pin into an electromagnetic wave in the waveguide mode propagating through the support substrate. The support substrate may function as an antenna for spatially radiating the electromagnetic wave propagating in the waveguide mode in the in-plane direction of the substrate.

The conductor pin 25 penetrates through the inorganic material substrate 1 from the signal electrode 2*a* to reach the SIW in the support substrate 20. The conductor pin 25 may serve as a propagation medium for an electromagnetic wave. The conductor pin 25 includes a conductor material, and typically includes the same metal (described later) as that of each of the coplanar electrodes 2. In the illustrated example, the conductor pin 25 extends in the thickness direction of the inorganic material substrate 1. The conductor pin 25 may have a pillar shape such as a columnar shape, or may have a tubular shape (i.e., hollow shape) such as a cylindrical shape. The base end portion of the conductor pin 25 is connected to an end portion of the signal electrode 2*a*. The free end portion of the conductor pin 25 is inserted into an insertion hole 26 formed in the support substrate 20 (see FIG. 17). The insertion hole 26 is positioned between the first via row 22*a* and the second via row 22*b*, and is arranged side by side with the recess 21. The portion of the conductor pin 25 between the base end portion and the free end portion is inserted into an opening 31 that the first earth electrode 3 has.

The conductor pin 25 is preferably insulated from the first earth electrode 3. In one embodiment, as illustrated in FIG. 17, the opening 31 forms an air layer around the conductor pin 25. The opening 31 is larger than the contour of the conductor pin 25, and the entire periphery of the opening 31 is away from the conductor pin 25. Thus, the conductor pin can be insulated from the first earth electrode, and by extension, the signal electrode and the first earth electrode can be stably insulated. In addition, substrate resonance due to the leakage of an electric field to the support substrate can be still further suppressed. Further, the influence of the dielectric loss can be suppressed as compared to a structure in which the air layer is filled with a resin.

Figure 18:
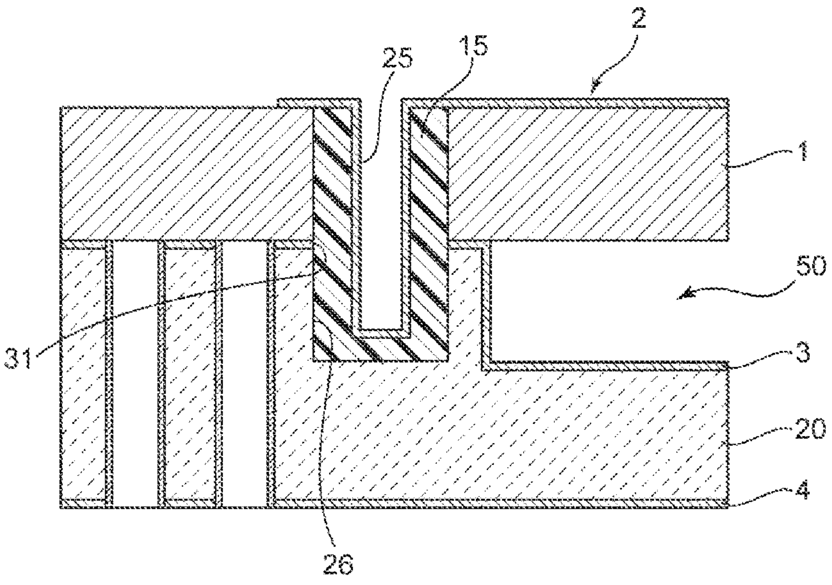
FIG. 18 is a schematic cross-sectional view for illustrating a state in which a conductor pin of FIG. 16 is covered with an insulating material.

As illustrated in FIG. 18, the periphery of the conductor pin 25 may be covered with an insulating material 15. Also in this case, the conductor pin can be insulated from the first earth electrode. Examples of the insulating material include a resin and $SiO_2$.

A-4. Overall Configuration of Waveguide Device 103

Figure 19:
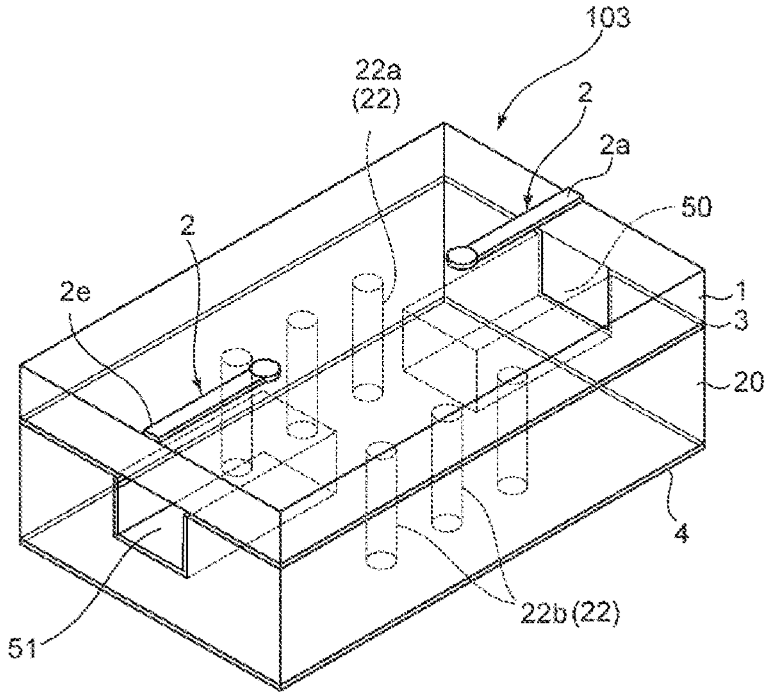
FIG. 19 is a schematic perspective view of a waveguide device according to still another embodiment of the present invention.

FIG. 19 is a schematic perspective view of a waveguide device according to still another embodiment of the present invention. In FIG. 19, a ground electrode and a via are omitted for convenience.

The waveguide device 103 includes a plurality of signal electrodes positioned away from each other. Accordingly, the waveguide device 103 includes a plurality of transmission lines corresponding to the signal electrodes. More specifically, the waveguide device 103 includes: the coplanar electrodes 2 including the first signal electrode 2*a* and a second signal electrode 2*e*; and a first conductor pin and a second conductor pin (not shown). In addition, the waveguide device 103 includes the first cavity (i.e., first low-dielectric constant portion) 50 and the second cavity (i.e., second low-dielectric constant portion) 51. The first cavity 50 is arranged so as to overlap at least part of the first signal electrode 2*a* in the thickness direction of the inorganic material substrate 1. The second cavity 51 is arranged so as to overlap at least part of the second signal electrode 2*e* in the thickness direction of the inorganic material substrate 1.

The first signal electrode 2*a* forms a first transmission line together with one ground electrode (not shown), and the second signal electrode 2*e* forms a second transmission line together with another ground electrode (not shown). The first conductor pin couples the SIW, which is formed by the first earth electrode 3, the second earth electrode 4, and the plurality of through-substrate vias 22, and the first transmission line to each other. The second conductor pin couples the SIW, which is formed by the first earth electrode 3, the second earth electrode 4, and the plurality of through-substrate vias 22, and the second transmission line to each other.

Thus, in one embodiment, an electromagnetic wave (i.e., signal) in the transmission line mode propagating through the inorganic material substrate can be converted into the SIW mode via the first conductor pin, then propagated through the support substrate in the SIW mode, and then converted via the second conductor pin again into the transmission line mode propagating through the inorganic material substrate. In this embodiment, the electromagnetic wave that has propagated through the inorganic material substrate may be emitted from an antenna device arranged on the inorganic material substrate.

The above-mentioned waveguide devices each include one support substrate 20, but the number of the support substrates 20 is not particularly limited. Although not shown, in each of the waveguide devices, a plurality of the support substrates may be arranged at a distance from each other in the thickness direction of the inorganic material substrate, and a substrate-integrated waveguide (i.e., SIW) may be arranged in each of the plurality of support substrates. With such a configuration, antenna portions for radiating electromagnetic waves in the SIW mode can be arrayed in the thickness direction. Accordingly, such waveguide device can be used as a phased array antenna in wireless communications.

In addition, when the waveguide device includes the plurality of support substrates, the second earth electrode may be arranged between the support substrates adjacent to each other out of the plurality of support substrates. Thus, the SIW to be arranged in each of the support substrates is formed by the metal layers arranged on both sides of the support substrate (i.e., the first earth electrode and the second earth electrode, or two second earth electrodes) and the plurality of through-substrate vias that penetrate through the support substrate.

In addition, in the waveguide device, a plurality of waveguide units each including a SIW may be arranged at a distance from each other in the thickness direction of the inorganic material substrate. Each of the plurality of waveguide units includes the first earth electrode, the support substrate, the second earth electrode, and the plurality of through-substrate vias.

In addition, a spacer substrate may be arranged between the support substrates adjacent to each other out of the plurality of support substrates. The spacer substrate may be arranged between the waveguide units adjacent to each other. Through the arrangement of the spacer substrate, a distance between antenna portions in the plurality of support substrates can be adjusted. In particular, when the distance between the plurality of antenna portions is adjusted to $\lambda/2$, the radiation angle of an electromagnetic wave can be sufficiently scanned. As a material for the spacer substrate, there is typically given the same inorganic material (described later) as that for the inorganic material substrate.

In addition, the waveguide device including the plurality of SIWs preferably includes the signal electrodes and the conductor pins in the same numbers as that of the SIWs. The respective conductor pins couple transmission paths formed by the respective signal electrodes to the corresponding SIWs. With such a configuration, while the waveguide device can be relatively easily produced, signals (i.e., electromagnetic waves) from external signal sources arranged on the inorganic material substrate can be easily propagated to the SIW of each support substrate.

As used herein, the term "waveguide device" encompasses both of a wafer having formed thereon at least one waveguide device (i.e., waveguide device wafer) and a chip obtained by cutting the waveguide device wafer.

B. Inorganic Material Substrate

The inorganic material substrate 1 has an upper surface on which the coplanar electrodes 2 are arranged, and a lower surface positioned inside a composite substrate.

The inorganic material substrate 1 includes an inorganic material. Any appropriate material may be used as the inorganic material as long as the effects according to the embodiments of the present invention are obtained. Typical examples of such material include monocrystalline quartz (i.e., relative dielectric constant: 4.5, dielectric loss tangent: 0.0013), amorphous quartz (i.e., quartz glass, relative dielectric constant: 3.8, dielectric loss tangent: 0.0010), spinel (i.e., relative dielectric constant: 8.3, dielectric loss tangent: 0.0020), AlN (i.e., relative dielectric constant: 8.5, dielectric loss tangent: 0.0015), sapphire (i.e., relative dielectric constant: 9.4, dielectric loss tangent: 0.0030), SiC (i.e., relative dielectric constant: 9.8, dielectric loss tangent: 0.0022), magnesium oxide (i.e., relative dielectric constant: 10.0, dielectric loss tangent: 0.0012), and silicon (i.e., relative dielectric constant: 11.7, dielectric loss tangent: 0.0016) (The relative dielectric constants and the dielectric loss tangents in parentheses each represent a numerical value at a frequency of 300 GHz). The inorganic material substrate 1 is preferably a quartz glass substrate including amorphous quartz.

When the inorganic material substrate 1 is a quartz glass substrate, even in the case of guiding the above-mentioned high-frequency electromagnetic wave, an increase in propagation loss can be stably suppressed. Further, the quartz glass substrate has a large dielectric constant as compared to a resin-based substrate, and hence can be reduced in substrate size, and besides, has a relatively small dielectric constant among inorganic materials, and hence is advantageous in achieving a low delay.

In addition, quartz glass has a small dielectric loss (i.e., tan $\delta$), and further has the following feature unlike the resin-based substrate: a conductor layer (i.e., metal layer) for forming a line can be formed without surface roughening surface treatment. Accordingly, the propagation loss can be further reduced.

C. Coplanar Electrodes and Earth Electrodes

Typically, the coplanar electrodes 2 are arranged on the upper surface of the inorganic material substrate 1, and are brought into direct contact with the inorganic material substrate 1. The coplanar electrodes 2 each typically include a metal. Examples of the metal include chromium (Cr), nickel (Ni), copper (Cu), and gold (Au). The metals may be used alone or in combination thereof. Each of the coplanar electrodes 2 may be a single layer, or may be formed by laminating two or more layers. The coplanar electrodes 2 are formed on the inorganic material substrate 1 by a known film formation method such as sputtering (i.e., alternatively, vapor deposition or printing).

The thickness of each of the coplanar electrodes 2 is, for example, 1 μm or more, preferably 4 μm or more, and is, for example, 20 μm or less, preferably 10 μm or less.

The first earth electrode 3 is arranged on the upper surface of the support substrate 20. The first earth electrode 3 may be formed from the same metal as that of each of the coplanar electrodes 2. In addition, the metal of the first earth electrode 3 may be the same as the metal of each of the coplanar electrodes 2, or may be different from the metal of the coplanar electrode 2. The ranges of the thickness of the first earth electrode 3 are the same as the ranges of the thickness of each of the coplanar electrodes 2. The first earth electrode 3 is formed on the surface of the support substrate 20 by, for example, sputtering or plating.

The second earth electrode 4 is formed on the surface of the support substrate 20 on the opposite side to the first earth electrode 3 by, for example, sputtering or plating. The second earth electrode 4 may be formed from the same metal as that of each of the coplanar electrodes 2. In addition, the metal of the second earth electrode 4 may be the same as the metal of each of the coplanar electrodes 2, or may be different from the metal of the coplanar electrode 2. The ranges of the thickness of the second earth electrode 4 are the same as the ranges of the thickness of each of the coplanar electrodes 2. The second earth electrode 4 may not be necessarily formed on the entirety of the surface of the support substrate 20 on the opposite side to the first earth electrode.

D. Support Substrate

The support substrate 20 has an upper surface positioned inside the composite substrate and a lower surface exposed to the outside. The above-mentioned recess 21 may be formed in the upper surface of the support substrate 20. The support substrate 20 is arranged for improving the strength of the composite substrate, and thus, the thickness of the inorganic material substrate can be reduced as described above. Any appropriate configuration may be adopted as the support substrate 20. Specific examples of a material for forming the support substrate 20 include indium phosphide (i.e., InP), silicon (i.e., Si), glass, SiAlON (i.e., $Si_3N_4$—$Al_2O_3$), mullite (i.e., $3Al_2O_3 \cdot 2SiO_2$, $2Al_2O_3 \cdot 3SiO_2$), aluminum nitride (i.e., AlN), magnesium oxide (i.e., MgO), aluminum oxide (i.e., $Al_2O_3$), spinel (i.e., $MgAl_2O_4$), sapphire, quartz, crystal, gallium nitride (i.e., GaN), silicon carbide (i.e., SiC), silicon nitride (i.e., $Si_3N_4$), and gallium oxide (i.e., $Ga_2O_3$).

The support substrate 20 preferably includes at least one selected from the group consisting of: indium phosphide; silicon; aluminum nitride; silicon carbide; and silicon nitride, and more preferably includes silicon.

When an active device, such as an oscillator or a receiver, is mounted on the waveguide device 100, there is a risk in that the inorganic material substrate may become heated as to degrade the characteristics of any other active device or mounted part. In order to prevent this situation, a material having a high thermal conductivity may be used for the support substrate. In this case, the thermal conductivity is preferably 150 W/Km or more, and from this viewpoint, examples of the support substrate 20 include silicon (i.e., Si), aluminum nitride (i.e., AlN), gallium nitride (i.e., GAN), silicon carbide (i.e., SiC), and silicon nitride (i.e., $Si_3N_4$).

In addition, when a SIW is formed in the support substrate 20, a material having a small dielectric loss tan δ is preferred in order to reduce the loss of the electromagnetic wave to be propagated in the SIW. In this case, the material for the support substrate is preferably selected from monocrystalline quartz, amorphous quartz, spinel, AlN, sapphire, aluminum oxide, SiC, magnesium oxide, or silicon.

Of such materials for the support substrate, silicon is more preferably selected.

The thickness of the support substrate 20 is, for example, $\lambda/4\sqrt{\varepsilon_b}$ or more, preferably $\lambda/2\sqrt{\varepsilon_b}$ or more, and for example, $2\lambda/\sqrt{\varepsilon_b}$ or less, preferably $3\lambda/2\sqrt{\varepsilon_b}$ or less, more preferably $\lambda/\sqrt{\varepsilon_b}$ or less, where $\varepsilon_b$ represents the relative dielectric constant of the support substrate 20, and λ represents the wavelength of the electromagnetic wave to be guided by the waveguide device. When the thickness of the support substrate is equal to or larger than the above-mentioned lower limits, an improvement in mechanical strength of the waveguide device can be stably achieved. When the thickness of the support substrate is equal to or smaller than the above-mentioned upper limits, the suppression of slab-mode propagation, the thinning of the waveguide device (i.e., retention of the mechanical strength of the waveguide device), and the suppression of substrate resonance can be achieved.

In the case where a plurality of support substrates are arranged at a distance from each other in the thickness direction of the inorganic material substrate, when the waveguide device is used as a phased array antenna, the distance between the support substrates adjacent to each other is desirably about λ/2, which is suited for an antenna pitch. In the case where the thickness of each of the support substrates is less than the distance between the support substrates adjacent to each other, an appropriate antenna pitch can be achieved by arranging the spacer substrate between the support substrates adjacent to each other.

The linear expansion coefficient of the material for forming the support substrate 20 is preferably as close as possible to the linear expansion coefficient of the material for forming the inorganic material substrate 1. With such a configuration, the thermal deformation (i.e., typically, warpage) of the composite substrate can be suppressed. The linear expansion coefficient of the material for forming the support substrate 20 preferably falls within the range of from 50% to 150% of the linear expansion coefficient of the material for forming the inorganic material substrate 1.

The support substrate 20 is typically directly joined to the waveguide member 10 to support the waveguide member 10. In one embodiment, the inorganic material substrate 1 and the support substrate 20 are directly joined to each other. The phrase "directly joined" as used herein means that two layers or substrates are joined to each other without the use of an intermediate adhesive layer (e.g., an organic adhesive such as a resin). The form of the direct joining may be appropriately set in accordance with the configurations of the layers or the substrates to be joined to each other. Further, an interface formed by the direct joining is typically amorphized. Accordingly, the thermal resistance of the joining interface can be dramatically reduced as compared to resin adhesion (i.e., resin joining) with the organic adhesive. Thus, in the case where an active device (e.g., an oscillator or a receiver) is mounted on the waveguide device, even when heat generated from the active device is transferred to the inorganic material substrate, such heat can easily escape from the inorganic material substrate to a package through the support substrate. As a result, the heating of the inorganic material substrate can be suppressed, and hence the degradation of the characteristics of any other member (e.g., any other active device or mounted part) to be connected to the inorganic material substrate can be suppressed. The form of the direct joining may encompass the joining of the support substrate and the inorganic material substrate via the above-mentioned earth electrode 3 and/or a joining portion 60 to be described later.

Further, when those components are integrated by the direct joining, peeling in the waveguide device can be satisfactorily suppressed, and as a result, damage (e.g., a crack) to the inorganic material substrate resulting from such peeling can be satisfactorily suppressed.

Figure 20:
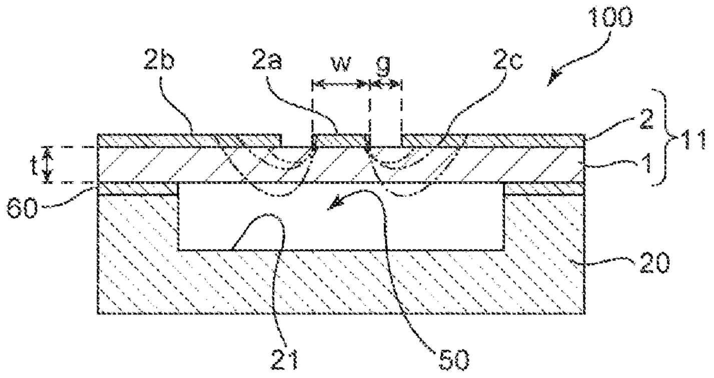
FIG. 20 is a schematic cross-sectional view for illustrating an example of the arrangement of a joining portion in the waveguide device of FIG. 3.

As illustrated in FIG. 20, the waveguide device 100 may further include the joining portion 60, which is arranged between the waveguide member 11 and the support substrate 20 to join the waveguide member 11 and the support substrate 20 to each other. When the support substrate 20 has the recess 21, the joining portion 60 is typically arranged between the waveguide member 11 and the portion of the support substrate 20 without the recess 21. In this embodiment, only the joining portion 60 is arranged between the inorganic material substrate 1 and the support substrate 20. Thus, the inorganic material substrate 1 and the support substrate 20 are directly joined to each other only via the joining portion 60.

Figure 21:
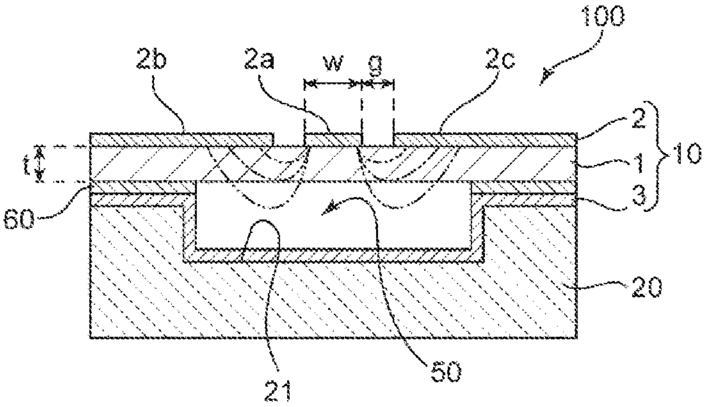
FIG. 21 is a schematic cross-sectional view for illustrating an example of the arrangement of a joining portion in the waveguide device of FIG. 2.

In the waveguide device 100 illustrated in each of FIG. 1 and FIG. 2, the joining portion (not shown) is positioned between the inorganic material substrate 1 and the earth electrode 3 positioned in the portion of the support substrate 20 without the recess 21, and may integrate the substrate and the electrode with each other. As illustrated in FIG. 21, the earth electrode 3 is formed on the surface of the support substrate 20 on the inorganic material substrate side, and is brought into direct contact with the support substrate 20. In this embodiment, the joining portion 60 is positioned between the inorganic material substrate 1 and the earth electrode 3 to join the inorganic material substrate 1 and the earth electrode 3 to each other. In the illustrated example, the earth electrode 3 and the joining portion 60 are arranged between the inorganic material substrate 1 and the support substrate 20. Thus, the inorganic material substrate 1 and the support substrate 20 are directly joined to each other via the earth electrode 3 and the joining portion 60.

In addition, as illustrated in FIG. 2, the earth electrode 3 may function as a joining portion, which is brought into direct contact with the inorganic material substrate 1 and the portion of the support substrate 20 without including the recess 21 to join the inorganic material substrate 1 and the support substrate 20 to each other. In this embodiment, only the earth electrode 3 is arranged between the inorganic material substrate 1 and the support substrate 20. Thus, the inorganic material substrate 1 and the support substrate 20 are directly joined to each other via the earth electrode 3. In the case where the earth electrode 3 functions as the joining portion, the earth electrode 3 may be formed by: forming metal layers on both of the inorganic material substrate 1 and the support substrate 20; and directly joining the metal layers to each other. In this case, a joining interface is formed inside the earth electrode.

In addition, in the waveguide device 100 illustrated in each of FIG. 4 and FIG. 5, the joining portion may be positioned between the low-dielectric constant portion 51 and the inorganic material substrate 1, may be positioned between the low-dielectric constant portion 51 and the earth electrode 3, or may integrate the portion and the substrate or the electrode with each other.

Like those devices, an organic material such as an adhesive involved in joining is preferably free from being interposed between the coplanar electrodes 2 and the support substrate 20. Thus, thermal resistance at an interface between the inorganic material substrate 1 and the support substrate 20 can be reduced, and hence the degradation of the characteristics of an active device or a mounted part can be suppressed. However, when the low-dielectric constant portion includes an organic material such as a low-dielectric constant polymer, the organic material serving as the low-dielectric constant portion may be arranged between the coplanar electrodes 2 and the support substrate 20. A structure in which an organic material (e.g., an adhesive) without the low-dielectric constant portion is not interposed is obtained by directly joining the inorganic material substrate 1 and the support substrate 20 (i.e., the earth electrode may be formed on one, or both, of the inorganic material substrate 1 and the support substrate 20, or may not be formed thereon) to each other.

The joining portion may be one layer, or may be a laminate of two or more layers. The joining portion typically includes an inorganic material. Examples of a joining layer for forming the joining portion include $SiO_2$, amorphous silicon, and tantalum oxide. The joining portion may be a metal film selected from gold (i.e., Au), titanium (i.e., Ti), platinum (i.e., Pt), chromium (i.e., Cr), copper (i.e., Cu), tin (i.e., Sn), or combinations (i.e., alloys) thereof. When the joining portion is the metal film, adhesiveness with the earth electrode formed of a metal can be stably achieved, and therefore migration can be suppressed. Of those joining portions, an amorphous silicon layer is a preferred example. The thickness of the joining portion is, for example, 0.001 μm or more and 10 μm or less, preferably 0.1 μm or more and 3 μm or less.

Although the joining layer is preferably formed only in the joining portion, the layer may be formed in the recess as long as the thickness falls within the above-mentioned ranges because an influence on the propagation of an electromagnetic wave is small.

The direct joining may be achieved by, for example, the following procedure. In a high-vacuum chamber (e.g., about $1\times10^{-6}$ Pa), the joining surface of each of components (i.e., layers or substrates) to be joined to each other is irradiated with a neutralized beam. Thus, each joining surface is activated. Then, in a vacuum atmosphere, the activated joining surfaces are brought into contact with each other, and are joined to each other at normal temperature. The load at the time of joining the activated joining surfaces may be, for example, from 100 N to 20,000 N. In one embodiment, when the surface activation with a neutralized beam is performed, an inert gas is introduced into a chamber, and a high voltage is applied from a DC power source to an electrode arranged in the chamber. With such a configuration, an electric field generated between the electrode (i.e., positive electrode) and the chamber (i.e., negative electrode) causes electrons to move to generate atomic and ion beams derived from the inert gas. Among the beams that have reached a grid, the ion beam is neutralized at the grid, and hence a beam of neutral atoms is emitted from a high-speed atomic beam source. An atomic species for forming the beam is preferably an inert gas element (e.g., argon (i.e., Ar) or nitrogen (i.e., N)). At the time of the activation by beam irradiation, a voltage is, for example, from 0.5 kV to 2.0 kV, and a current is, for example, from 50 mA to 200 mA. The method for the direct joining is not limited thereto, and, for example, a surface activation method using a fast atom beam (i.e., FAB) or an ion gun, an atomic diffusion method, or a plasma joining method may be applied.

EXAMPLES

The present invention is specifically described below by way of Examples. However, the present invention is not limited by these Examples.

Examples 1 and 2

1-1. Production of Waveguide Device (i.e., Grounded Coplanar Line)

A waveguide device illustrated in FIG. 1 and FIG. 2 was produced.

A silicon wafer (i.e., support substrate) having a thickness of 525 μm was prepared. A resist film was patterned on the upper surface of the silicon wafer so that a region in the silicon wafer having a dimension corresponding to the value of the expression "width of signal electrode+gap "g" of clearance×20" was exposed directly below the signal electrode of coplanar electrodes to be described later. After that step, the portion of the silicon wafer exposed from the resist film was subjected to dry etching by reactive ion etching. Thus, a recess (i.e., hollow structure) was formed. The etching depth of the recess was set to a value (i.e., the thickness of a low-dielectric constant portion) shown in Table 1. Thus, the silicon wafer (i.e., support substrate) having the recess was prepared.

After that step, a Cr film having a thickness of 50 nm and a Ni film having a thickness of 100 nm were formed on the silicon wafer having formed therein the recess by sputtering to form an underlying electrode. Further, copper was formed into a film on the underlying electrode by electroplating to form an earth electrode. Next, an amorphous silicon film having a thickness of 0.2 μm was formed on the earth electrode by sputtering. After the film formation, the amorphous silicon film was subjected to planarization treatment by being polished. Here, the arithmetic average roughness of a □10 μm (i.e., 10 μm square area; the same applies hereinafter) on the surface of the amorphous silicon film was measured with an atomic force microscope, and was found to be 0.2 nm.

In addition, a quartz glass wafer (i.e., quartz glass substrate, inorganic material substrate) having a thickness of 0.5 mm was prepared, and an amorphous silicon film having a thickness of 0.2 μm was formed on the quartz glass wafer by sputtering. After the film formation, a resist was applied to the amorphous silicon film surface, and the portion corresponding to the recess (i.e., non-joining portion) of the silicon wafer was exposed by photolithography and developed (i.e., etched). Thus, a resist mask was formed. After that step, the amorphous silicon was removed by dry etching. Next, the amorphous silicon film was subjected to planarization treatment by being polished. Here, the arithmetic average roughness of a □10 μm on the surface of the amorphous silicon film was measured with an atomic force microscope, and was found to be 0.2 nm.

The amorphous silicon surface on the quartz glass wafer and the amorphous silicon surface on the earth electrode were joined to each other as described below. First, the quartz glass wafer and the silicon wafer were loaded into a vacuum chamber, and in a vacuum of the order of $10^{-6}$ Pa, both joining surfaces (i.e., the amorphous silicon surface on the quartz glass wafer and the amorphous silicon surface on the earth electrode) were irradiated with a high-speed Ar neutral atom beam (i.e., acceleration voltage: 1 kV, Ar flow rate: 60 sccm) for 70 seconds. After the irradiation, the quartz glass wafer and the silicon wafer were left to stand for 10 minutes to cool, and then the joining surfaces of the quartz glass wafer and the silicon wafer (i.e., beam-irradiated surfaces of the quartz glass wafer and the surface of the silicon wafer) were brought into contact with each other, followed by pressurization at 4.90 kN for 2 minutes to join the quartz glass wafer and the silicon wafer to each other. That is, the quartz glass wafer and the silicon wafer were directly joined to each other via an amorphous silicon layer (i.e., joining portion). After the joining, polishing processing was performed until the thickness of the quartz glass wafer became a value shown in Table 1. Thus, a composite wafer was formed. In the resultant quartz glass/earth electrode/silicon composite substrate, a defect such as peeling was not observed at the joining interface.

Then, a resist was applied to the surface (i.e., polished surface) of the quartz glass wafer on the opposite side to the silicon wafer, and patterning was performed by photolithography so as to expose portions for forming a coplanar electrode pattern. After that step, on the upper surface of the quartz glass wafer exposed from the resist, a Cr film having a thickness of 50 nm and a Ni film having a thickness of 100 nm were formed by sputtering to form an underlying electrode. Further, copper was formed into a film on the underlying electrode by electroplating to form a coplanar electrode pattern. The length of the signal electrode of the pattern in the waveguide direction was 10 mm. A gap "g" between the signal electrode and each ground electrode thereof was 13 μm.

Finally, the amorphous silicon layer in the recess (i.e., hollow structure) of the silicon wafer was removed by wet etching with buffered hydrofluoric acid (i.e., BHF).

Thus, there was obtained a waveguide device including: a waveguide member including coplanar electrodes, an inorganic material substrate, and an earth electrode; and a support substrate having a recess.

1-2. Calculation of Propagation Loss

In order to measure the propagation loss of the waveguide device, three waveguide devices having signal electrode lengths of 30 mm, 40 mm, and 50 mm were produced in the same manner as in the foregoing.

Then, an RF signal generator was coupled to the input side of the waveguide member of each of the waveguide devices with a probe, and another probe was placed on the output side of the waveguide member to couple an electromagnetic wave to an RF signal receiver.

Then, a voltage was applied to the RF signal generator to cause the RF signal generator to transmit an electromagnetic wave having a frequency shown in Table 1. Thus, the electromagnetic wave was propagated to the coplanar line (i.e., waveguide member). The RF signal receiver measured the RF power of the electromagnetic wave output from the coplanar line. A propagation loss (i.e., dB/cm) was calculated from the measurement results of the three waveguide devices having different signal electrode lengths, and was evaluated by the following criteria. The results are shown in Table 1.

◎ (excellent): less than 0.5 dB/cm
o (good): 0.5 dB/cm or more and less than 1 dB/cm
Δ (acceptable): 1 dB/cm or more and less than 2 dB/cm
x (unacceptable): 2 dB/cm or more

Examples 3 and 4

2-1. Production of Waveguide Device (i.e., Coplanar Line)

A waveguide device illustrated in FIG. 3 was produced.

A silicon wafer (i.e., support substrate) having a recess was prepared in the same manner as in Example 1. However, no earth electrode was formed on the silicon wafer having formed therein the recess. The arithmetic average roughness of the surface of a □10 μm on the surface of the silicon wafer was measured with an atomic force microscope, and was found to be 0.2 nm.

In addition, a quartz glass wafer (i.e., quartz glass substrate, inorganic material substrate) having a thickness of 0.5 mm was prepared, and a patterned amorphous silicon film was formed on the quartz glass wafer in the same manner as in Example 1. After the formation, the amorphous silicon film was subjected to planarization treatment by being polished. Here, the arithmetic average roughness of a □10 μm on the surface of the amorphous silicon film was measured with an atomic force microscope, and was found to be 0.2 nm.

After that step, the amorphous silicon surface on the quartz glass wafer and the silicon wafer were directly joined to each other. The direct joining was performed in the same manner as in Example 1. In the resultant quartz glass/silicon composite substrate, a defect such as peeling was not observed at the joining interface.

Then, the quartz glass wafer was polished so that the thickness was set to a value shown in Table 1.

Then, a coplanar electrode pattern was formed on the surface (i.e., polished surface) of the quartz glass wafer on the opposite side to the silicon wafer in the same manner as in Example 1. The length of the signal electrode of the pattern in the waveguide direction was 10 mm. A gap "g" between the signal electrode and each ground electrode thereof was 13 μm.

Thus, there was obtained a waveguide device including: a waveguide member including coplanar electrodes and an inorganic material substrate; and a support substrate having a recess.

2-2. Calculation of Propagation Loss

In addition, in order to measure the propagation loss of the waveguide device, three waveguide devices having signal electrode lengths of 30 mm, 40 mm, and 50 mm were produced in the same manner as in the foregoing. Next, in the same manner as in Example 1, an RF signal generator was coupled to the input side of the waveguide member of each of the waveguide devices with a probe, and another probe was placed on the output side of the waveguide member to couple an electromagnetic wave to an RF signal receiver, followed by the measurement of the RF power of the electromagnetic wave output from the coplanar waveguide of each of the devices with the RF signal receiver. The propagation losses of the waveguide devices of Examples 3 and 4 were each evaluated in the same manner as in Example 1. The results are shown in Table 1.

Example 5

A silicon wafer (i.e., support substrate) having a thickness of 525 μm and a quartz glass wafer (i.e., quartz glass substrate, inorganic material substrate) having a thickness of 0.5 mm were prepared, and a waveguide device, which included a waveguide member including coplanar electrodes and an inorganic material substrate, a polymer layer, an earth electrode, and a support substrate having a recess, was obtained.

First, with regard to the silicon wafer, a silicon wafer (i.e., support substrate) having a recess and an earth electrode was prepared in the same manner as in Example 1.

Next, a Teflon®, a fluorinated polymer resin having a relative dielectric constant of 2.3 was applied to the silicon wafer by spin coating, and was cured to form the polymer layer in the recess of the support substrate. After that step, CMP polishing was performed for removing the polymer outside the recess and planarizing the polymer layer on the support substrate. After the CMP polishing, an amorphous silicon film was formed on the layer by sputtering. After the film formation, a resist was applied to the amorphous silicon film surface, and the portion corresponding to the recess was exposed by photolithography and developed (i.e., etched). Thus, a resist mask was formed. After that step, the amorphous silicon was removed by dry etching. Next, the amorphous silicon film was subjected to planarization treatment by being polished. Here, the arithmetic average roughness of a □10 μm on the surface of the amorphous silicon film was measured with an atomic force microscope, and was found to be 0.2 nm.

In addition, with regard to the quartz glass wafer, an amorphous silicon film having a thickness of 0.2 μm was formed on the wafer by sputtering. After the film formation, a resist was applied to the amorphous silicon film surface, and the portion corresponding to the recess (i.e., non-joining portion) of the silicon wafer was exposed by photolithography and etched. Thus, a resist mask was formed. After that step, the amorphous silicon was removed by dry etching.

After that step, the amorphous silicon surface on the quartz glass wafer and the silicon wafer were directly joined to each other. The direct joining was performed in the same manner as in Example 1. In the resultant quartz glass/silicon composite substrate, a defect such as peeling was not observed at the joining interface.

Next, the quartz glass wafer was polished so that the thickness was set to a value shown in Table 1.

Next, a coplanar electrode pattern was formed on the surface (i.e., polished surface) of the quartz glass wafer on the opposite side to the silicon wafer in the same manner as in Example 1. The length of the signal electrode of the pattern in the waveguide direction was 10 mm. A gap "g" between the signal electrode and each ground electrode thereof was 13 μm.

Thus, there was obtained the waveguide device, which included the waveguide member including the coplanar electrodes and the inorganic material substrate, the polymer layer, the earth electrode, and the support substrate having the recess.

The propagation losses of the resultant waveguide device were calculated and evaluated in the same manner as in Example 1. The results are shown in Table 1.

Example 6

A waveguide device was produced in the same manner as in Example 1 without that the etching depth of the recess was changed so that the thickness of the cavity was changed to a value shown in Table 1.

The propagation losses of the resultant waveguide device were calculated and evaluated in the same manner as in Example 1. The results are shown in Table 1.

Example 7

A waveguide device was produced in the same manner as in Example 1 except that: the quartz glass wafer serving as the inorganic material substrate was changed to a monocrystalline silicon wafer; and the etching depth of the recess was changed so that the thickness of the cavity was changed to a value shown in Table 1.

Example 8

A waveguide device was produced in the same manner as in Example 1 except that: the quartz glass wafer serving as the inorganic material substrate was changed to a sapphire wafer; and the etching depth of the recess was changed so that the thickness of the cavity was changed to a value shown in Table 1.

The propagation losses of the resultant waveguide device were calculated and evaluated in the same manner as in Example 1. The results are shown in Table 1.

Example 9

A waveguide device was produced in the same manner as in Example 1 except that: the quartz glass wafer serving as the inorganic material substrate was changed to a polycrystalline AlN wafer; and the etching depth of the recess was changed so that the thickness of the cavity was changed to a value shown in Table 1.

The propagation losses of the resultant waveguide device were calculated and evaluated in the same manner as in Example 1. The results are shown in Table 1.

Example 10

A waveguide device illustrated in each of FIG. 4 and FIG. 5 was produced.

A silicon wafer (i.e., support substrate) having a thickness of 525 μm and a quartz glass wafer (i.e., quartz glass substrate, inorganic material substrate) having a thickness of 0.5 mm were prepared, and a waveguide device, which included a waveguide member including coplanar electrodes and an inorganic material substrate, a polymer layer, an earth electrode, and a support substrate free of any recess, was obtained.

First, the silicon wafer (i.e., support substrate) having a thickness of 525 μm was prepared. After that step, a Cr film having a thickness of 50 nm and a Ni film having a thickness of 100 nm were formed on the silicon wafer by sputtering to form an underlying electrode. Further, copper was formed into a film on the underlying electrode by electroplating to form an earth electrode.

Next, a thermosetting Teflon® a fluorinated polymer film having a relative dielectric constant of 2.3 was bonded to the earth electrode, and was cured to form a polymer layer having a thickness of 100 μm on the earth electrode. Further, an amorphous silicon film was formed on the layer by sputtering. After the film formation, a resist was applied to the amorphous silicon film surface, and the region directly below the coplanar electrodes, the region having a dimension corresponding to the value of the expression "width of signal electrode+gap "g" of clearance×20," was exposed by photolithography and developed (i.e., etched). Thus, a resist mask was formed. After that step, the amorphous silicon was removed by dry etching. Next, the amorphous silicon film was subjected to planarization treatment by being polished. Here, the arithmetic average roughness of a □10 μm on the surface of the amorphous silicon film was measured with an atomic force microscope, and was found to be 0.2 nm.

In addition, with regard to the quartz glass wafer, an amorphous silicon film having a thickness of 0.2 μm was formed on the wafer by sputtering. After the film formation, a resist was applied to the amorphous silicon film surface, and the region directly below the coplanar electrodes, the region having a dimension corresponding to the value of the expression "width of signal electrode+gap "g" of clearance×20," was exposed by photolithography and etched. Thus, a resist mask was formed. After that step, the amorphous silicon was removed by dry etching. The amorphous silicon film was subjected to planarization treatment by being polished. Here, the arithmetic average roughness of a □10 μm on the surface of the amorphous silicon film was measured with an atomic force microscope, and was found to be 0.2 nm.

After that step, the amorphous silicon surface on the quartz glass wafer and the amorphous silicon surface on the polymer layer were directly joined to each other. The direct joining was performed in the same manner as in Example 1. In the resultant quartz glass/silicon composite substrate, a defect such as peeling was not observed at the joining interface.

Next, the quartz glass wafer was polished so that the thickness was set to a value shown in Table 1.

Next, a coplanar electrode pattern was formed on the surface (i.e., polished surface) of the quartz glass wafer on the opposite side to the silicon wafer in the same manner as in Example 1. The length of the signal electrode of the pattern in the waveguide direction was 10 mm. A gap "g" between the signal electrode and each ground electrode thereof was 13 μm.

Thus, there was obtained the waveguide device, which included the waveguide member including the coplanar electrodes and the inorganic material substrate, the polymer layer, the earth electrode, and the support substrate free of any recess.

The propagation losses of the resultant waveguide device were calculated and evaluated in the same manner as in Example 1. The results are shown in Table 1.

Example 11

A waveguide device was obtained in the same manner as in Example 1 except that the thickness of the quartz glass wafer (i.e., quartz glass substrate, inorganic material substrate) after the polishing was changed to 10 μm.

The propagation losses of the resultant waveguide device were calculated and evaluated in the same manner as in Example 1. The results are shown in Table 1.

Comparative Examples 1 and 2

Waveguide devices were each produced in the same manner as in Example 1 except that: no recess was formed in the silicon wafer (i.e., support substrate); and the thickness of the quartz glass wafer after the polishing was changed to a value shown in Table 1.

The propagation losses of each of the resultant waveguide devices were calculated and evaluated in the same manner as in Example 1. The results are shown in Table 1.

TABLE 1

| No. | | | Example 1 | Example 2 | Example 3 | Example 4 | Example 5 | Example 6 |
|---|---|---|---|---|---|---|---|---|
| Waveguide member | | Form | Grounded coplanar line | | Coplanar line | | Grounded coplanar line | |
| | Inorganic material substrate | Material | Quartz glass (amorphous) | | Quartz glass (amorphous) | | Quartz glass (amorphous) | |
| | | Relative dielectric constant [−] | 3.8 | | 3.8 | | 3.8 | |
| | | Dielectric loss tangent [−] | 0.0010 | | 0.0010 | | 0.0010 | |
| | | Thickness [μm] | 50 | 100 | 50 | 100 | 50 | 50 |
| | Low-dielectric constant portion | Form | Cavity | | Cavity | | Recess + polymer layer | Cavity |
| | | Thickness [μm] | 100 | | 100 | | 100 | 10 |
| | λ/a√ε | λ [μm] | 300 (1 THz) | | | | | |
| | | a = 2 | 76.9 | | 76.9 | | 76.9 | |
| Evaluation | Propagation loss | 30 GHz | ◎ | ◎ | ○ | ○ | Δ | Δ |
| | | 300 GHz | ◎ | ◎ | ○ | ○ | Δ | Δ |
| | | 500 GHz | ○ | ◎ | ○ | ○ | Δ | Δ |
| | | 1 THz | ○ | Δ | ○ | Δ | Δ | Δ |

| No. | | | Example 7 | Example 8 | Example 9 | Example 10 | Example 11 | Comparative Example 1 | Comparative Example 2 |
|---|---|---|---|---|---|---|---|---|---|
| Waveguide member | | Form | Grounded coplanar line | | | | | Grounded coplanar line | |
| | Inorganic material substrate | Material | Monocrystalline silicon | Sapphire | Polycrystalline AlN | Quartz glass (amorphous) | | Quartz glass (amorphous) | |
| | | Dielectric loss tangent [−] | 0.0016 | 0.0030 | 0.0015 | 0.0010 | 0.0010 | 0.0010 | |
| | | Thickness [μm] | 50 | 50 | 50 | 50 | 10 | 300 | 50 |
| | Low-dielectric constant portion | Form | Cavity | Cavity | Cavity | Polymer layer | Cavity | | |
| | | Thickness [μm] | | 60 | | 100 | 100 | | |
| | λ/a√ε | λ [μm] | | | | 300 (1 THz) | | | |
| | | a = 2 | 43.7 | 48.7 | 51.4 | 76.9 | 76.9 | | |
| Evaluation | Propagation loss | 30 GHz | ○ | Δ | ○ | Δ | ◎ | Δ | Δ |
| | | 300 GHz | ○ | Δ | ○ | Δ | ◎ | X | Δ |
| | | 500 GHz | ○ | Δ | ○ | Δ | ◎ | X | Δ |
| | | 1 THz | Δ | Δ | Δ | Δ | ○ | X | X |

As is apparent from Table 1, it is found that when a low-dielectric constant portion (i.e., in particular, a cavity) having a dielectric constant smaller than the dielectric constant of an inorganic material substrate is arranged below the inorganic material substrate, a propagation loss is small and excellent low-propagation loss performance can be achieved over a wide frequency range in a high-frequency region of more than 30 GHZ.

The waveguide device according to the embodiments of the present invention can be used in a wide range of fields, such as waveguides, next-generation high-speed communication, sensors, laser processing, and solar power generation, and in particular, can be suitably used as a waveguide for a millimeter wave/terahertz wave. Such waveguide device can be used for, for example, an antenna, a band-pass filter, a coupler, a delay line (i.e., phase shifter), or an isolator.

What is claimed is:

1. A waveguide device, comprising:

a waveguide member including an inorganic material substrate and coplanar electrodes arranged above the inorganic material substrate, the waveguide member being capable of guiding an electromagnetic wave having a frequency of 30 GHz or more and 20 THz or less;

a support substrate, which is arranged below the inorganic material substrate, and is configured to support the waveguide member; and a low-dielectric constant portion, which is arranged below the inorganic material substrate, and has a dielectric constant smaller than a dielectric constant of the inorganic material substrate; and wherein a thickness "t" of the inorganic material substrate satisfies the following formula (1):

$$t < \frac{\lambda}{a\sqrt{\varepsilon}} \quad (1)$$

where λ represents a wavelength of the electromagnetic wave guided by the waveguide member, ε represents a relative dielectric constant of the inorganic material substrate and "a" represents a numerical value of 2.

2. The waveguide device according to claim 1, wherein the inorganic material substrate has a relative dielectric constant ε of 3.5 or more and 12 or less, and a dielectric loss tangent tan δ of 0.003 or less at 300 GHz.

3. The waveguide device according to claim 1, wherein the support substrate has a recess, wherein a lower surface of the inorganic material substrate and the recess of the support substrate define a cavity, and wherein the cavity functions as the low-dielectric constant portion.

4. The waveguide device according to claim 3, wherein the coplanar electrodes include a signal electrode extending in a predetermined direction, and ground electrodes each positioned in a direction intersecting the predetermined direction at a distance from the signal electrode, and wherein when a dimension of a respective gap between the signal electrode and each of the ground electrodes in the direction intersecting the predetermined direction is represented by "g", a dimension of the cavity in a thickness direction of the inorganic material substrate is equal to or more than "g".

5. The waveguide device according to claim 1, further comprising an earth electrode positioned between the inorganic material substrate and the support substrate; and wherein the earth electrode is positioned between a lower surface of the low-dielectric constant portion and an upper surface of the support substrate.

6. The waveguide device according to claim 2, wherein the inorganic material substrate is a quartz glass substrate.

* * * * *